(12) United States Patent
Nishiyama

(10) Patent No.: US 11,137,218 B2
(45) Date of Patent: Oct. 5, 2021

(54) INTERCOOLER

(71) Applicant: DENSO CORPORATION, Kariya (JP)

(72) Inventor: Koki Nishiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 13 days.

(21) Appl. No.: 16/449,497

(22) Filed: Jun. 24, 2019

(65) Prior Publication Data

US 2019/0310032 A1    Oct. 10, 2019

Related U.S. Application Data

(63) Continuation of application No. PCT/JP2017/041351, filed on Nov. 16, 2017.

(30) Foreign Application Priority Data

Dec. 26, 2016   (JP) .............................. JP2016-251186

(51) Int. Cl.
   *F28F 9/00*      (2006.01)
   *F02B 29/04*     (2006.01)
   (Continued)

(52) U.S. Cl.
   CPC .............. *F28F 9/002* (2013.01); *F02B 29/04* (2013.01); *F02B 29/0437* (2013.01);
   (Continued)

(58) Field of Classification Search
   CPC ...... F02B 29/04; F02B 29/0437; F02D 23/00; F28F 9/002; F28F 1/40; F28F 2275/04;
   (Continued)

(56) References Cited

U.S. PATENT DOCUMENTS 2,616,671 A * 11/1952 Wakeman ............... F28F 3/083
                                                    165/167
4,327,802 A *  5/1982 Beldam ................. F28D 9/0093
                                                    165/153
(Continued)

FOREIGN PATENT DOCUMENTS

DE    112017006549 T5 * 10/2019 ........... F28D 9/0093
EP        2481899 A1     8/2012
(Continued)

OTHER PUBLICATIONS

U.S. Appl. No. 16/449,494, filed Jun. 24, 2019, Nishiyama.

*Primary Examiner* — Ljiljana V. Ciric
(74) *Attorney, Agent, or Firm* — Harness, Dickey & Pierce, P.L.C.

(57) ABSTRACT

An intercooler includes a cooling tube having a first coolant passage through which a first coolant flows and a second coolant passage through which a second coolant flows. A pair of plate portions having a predetermined shape are bonded with each other by brazing such that the pair of plate portions are superposed on each other to define the first coolant passage and the second coolant passage between the pair of plate portions. The cooling tube includes a passage partition portion separating the first coolant passage from the second coolant passage at a part of the pair of plate portions between the first coolant passage and the second coolant passage, and at least one through-hole in the passage partition portion. At least one swaged portion that crimps the pair of plate portions is provided at a periphery of the through-hole.

4 Claims, 20 Drawing Sheets

(51) Int. Cl.
  *F02D 23/00* (2006.01)
  *F02M 31/20* (2006.01)
  *F28D 9/00* (2006.01)
  *F28F 1/40* (2006.01)
  *F01P 5/12* (2006.01)

(52) U.S. Cl.
  CPC ............. *F02D 23/00* (2013.01); *F02M 31/20* (2013.01); *F28D 9/0056* (2013.01); *F28F 1/40* (2013.01); *F01P 5/12* (2013.01); *F28F 2275/04* (2013.01); *F28F 2275/122* (2013.01); *Y02T 10/12* (2013.01)

(58) Field of Classification Search
  CPC ........ F28F 2275/122; F28F 3/025; F28F 3/06; F28F 9/001; F02M 31/20; F28D 9/0056; F28D 2021/0082; F28D 9/0093; F28D 1/0391; Y02T 10/12; F01P 5/12; F01P 7/16; F01P 3/20; F01P 2060/02; F01P 2060/08
  USPC .......................................................... 165/51
  See application file for complete search history.

(56) References Cited

U.S. PATENT DOCUMENTS

| | | | | |
|---|---|---|---|---|
| 5,029,639 A * | 7/1991 | Finnemore | ............ | F28D 9/0025 165/166 |
| 5,056,590 A * | 10/1991 | Bohn | ...................... | F28F 3/083 165/78 |
| 6,199,626 B1 * | 3/2001 | Wu | .......................... | F28F 3/04 165/167 |
| 7,219,720 B2 * | 5/2007 | Wakita | .................... | B23P 15/26 165/153 |
| 7,341,098 B2 * | 3/2008 | Brost | .................... | F28F 9/0229 165/149 |
| 7,610,949 B2 * | 11/2009 | Palanchon | ............ | F28D 9/0043 165/103 |
| 7,681,629 B2 * | 3/2010 | Yamaguchi | ............ | F28D 9/0037 165/166 |
| 9,903,661 B2 * | 2/2018 | Odillard | .................. | F28F 13/06 |
| 10,047,663 B2 * | 8/2018 | Kinder | ...................... | F28D 1/03 |
| 10,077,954 B2 * | 9/2018 | Woollen | .................... | F28F 9/02 |
| 10,809,009 B2 * | 10/2020 | Schouten | .................. | F28F 9/22 |
| 2005/0284620 A1 * | 12/2005 | Thunwall | .............. | F28F 9/0246 165/167 |
| 2013/0105128 A1 * | 5/2013 | Vanderwees | .......... | F28D 9/0068 165/165 |
| 2015/0292819 A1 * | 10/2015 | Woollen | .................. | F28F 9/001 165/157 |
| 2015/0323266 A1 * | 11/2015 | Bardeleben | ............. | F28F 3/025 165/76 |
| 2016/0018169 A1 * | 1/2016 | Powell | .................. | F28D 9/0056 165/109.1 |
| 2016/0097596 A1 * | 4/2016 | Stewart | ............... | F02B 29/0462 165/175 |
| 2016/0326949 A1 | 11/2016 | Harada et al. | | |
| 2018/0292142 A1 * | 10/2018 | Schouten | ................ | F28D 9/0006 |
| 2019/0041137 A1 * | 2/2019 | Stewart | ................... | F28F 9/001 |

FOREIGN PATENT DOCUMENTS

JP     2015155692 A        8/2015
JP     6601384 B2 *  11/2019 ............. F02B 29/04

* cited by examiner

INTERCOOLER

CROSS REFERENCE TO RELATED APPLICATIONS

The present application is a continuation application of International Patent Application No. PCT/JP2017/041351 filed on Nov. 16, 2017, which designated the United States and claims the benefit of priority from Japanese Patent Application No. 2016-251186 filed on Dec. 26, 2016. The entire disclosures of all of the above applications are incorporated herein by reference.

TECHNICAL FIELD

The present disclosure relates to an intercooler that cools supercharged intake air supplied to an internal combustion engine through a supercharger.

BACKGROUND

A general intercooler cools supercharged intake air, which is supplied to an engine through a supercharger, by exchanging heat with a first cooling medium and a second cooling medium whose temperatures are different.

In the intercooler, a first cooling medium passage through which the first cooling medium flows and a second cooling medium passage are defined in a flow path tube constituting a heat exchange portion.

SUMMARY

An intercooler of the present disclosure is configured to cool supercharged intake air supplied to an internal combustion engine through a supercharger.

According to an aspect of the present disclosure, the intercooler includes a cooling tube that defines therein a first coolant passage through which a first coolant exchanging heat with the supercharged intake air flows, and a second coolant passage through which a second coolant exchanging heat with the supercharged intake air flows. A temperature of the second coolant is lower than a temperature of the first coolant.

A pair of plate portions having a predetermined shape are bonded with each other by brazing in a condition where the pair of plate portions are superposed on each other such that the first coolant passage and the second coolant passage are defined between the pair of plate portions.

The cooling tube includes a passage partition portion separating the first coolant passage from the second coolant passage at a part of the pair of plate portions between the first coolant passage and the second coolant passage, and at least one through-hole in the passage partition portion. At least one swaged portion that crimps the pair of plate portions is provided in a periphery of the through-hole.

EMBODIMENTS

In the cooling tube of the conventional intercooler, the first cooling medium passage and the second cooling medium passage are defined inside the cooling tube by bonding plate portions in a state where the plate portions having a predetermined shape are stacked with each other. In the cooling tube having this kind of structure, in order to separate the first cooling medium passage and the second cooling medium passage, a passage partition portion that divides the first cooling medium passage and the second cooling medium passage is needed.

The inventor of the present disclosure has studied to provide the passage partition portion in the cooling tube by bonding via brazing a part of the plate portion located between the first cooling medium passage and the second cooling medium passage in a state where the part is pressed.

As a result of the study by the inventor, since the passage partition portion partitioning the coolant passages is located in an inside part of the plate, it may be difficult to press the passage partition portion of the plate portions, and accordingly the pressing of the plate portions may be insufficient. If the brazing at the passage partition portion is insufficient, it is not preferable because the cooling medium may be likely to leak from the cooling tube.

Embodiments of the present disclosure will be hereinafter described with reference to the drawings. In the following embodiments, parts, which are the same as or equivalent to those described in the preceding embodiment(s), will be indicated by the same reference signs, and the description thereof may be omitted. In addition, when only a part of components is described in the embodiment, the components described in the preceding embodiment can be applied to other parts of the components. The respective embodiments described herein may be partially combined with each other as long as no particular problems are caused even without explicit statement of these combinations.

First Embodiment

The present embodiment will be hereinafter described with reference to FIGS. 1 to 14. In the present embodiment, an example in which an intercooler 10 of the present disclosure is used in a cooling system for cooling supercharged intake air supplied to an engine EG that is an internal combustion engine from a supercharger SC mounted on a vehicle is described.

Figure 1:
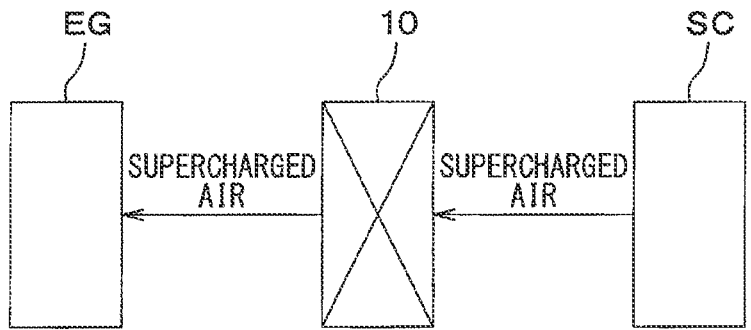
FIG. 1 is a diagram schematically illustrating an air intake system of an engine of a vehicle according to at least one embodiment.

As shown in FIG. 1, the supercharger SC that compresses air supplied to the engine EG is located upstream of the engine EG in an air intake system of the engine of the vehicle. The supercharger SC compresses the air supplied to the engine EG to improve the output of the engine EG by increasing the density of the air.

Since the supercharger SC is mounted on the vehicle of the present embodiment, the amount of exhaust gas of the engine EG can be reduced while the power performance of the engine EG is secured. Such a vehicle has an advantage of reducing the fuel consumption of the engine EG.

In the air intake system, a water-cooled type intercooler 10 that cools the supercharged intake air supplied to the engine EG through the supercharger SC is provided between the supercharger SC and the engine EG. The intercooler 10 cools the supercharged intake air so as to improve a charging efficiency of the engine EG intake air.

Figure 2:
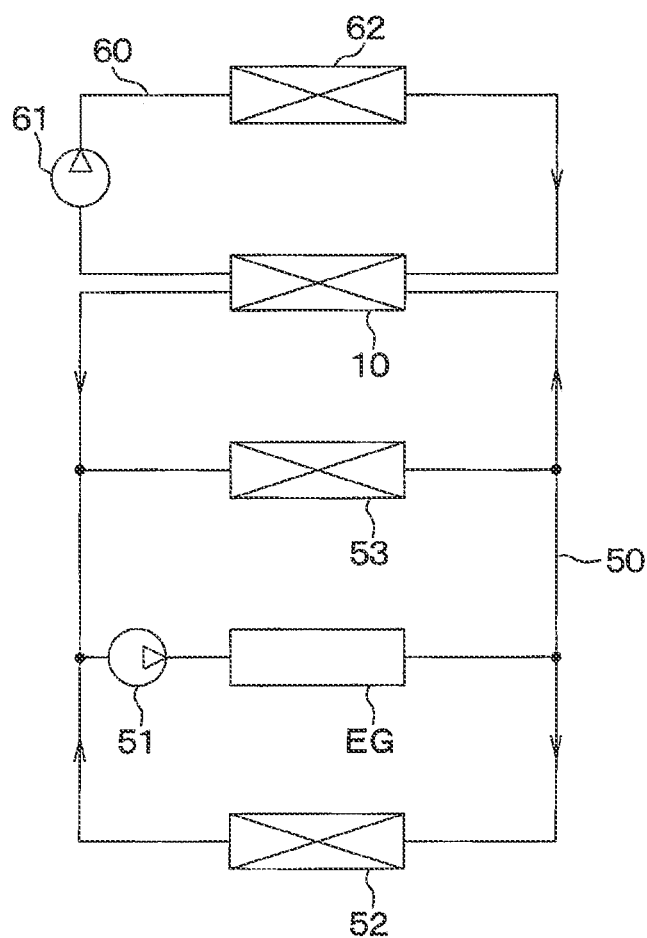
FIG. 2 is a diagram schematically illustrating a cooling circuit of a cooling system according to at least one embodiment.

The intercooler 10 is provided in a main cooling circuit 50 in which an engine cooling water cooling the engine EG circulates, as shown in FIG. 2. Antifreeze liquid or water containing ethylene glycol etc. is adopted as the engine cooling water.

The intercooler 10 of the present embodiment cools the supercharged intake air by using the engine cooling water as a first coolant. The detailed structure of the intercooler 10 of the present embodiment will be described later.

A main circulation pump 51 that circulates the engine cooling water, a main radiator 52, and a heater core 53 are provided in the main cooling circuit 50 in addition to the intercooler 10 of the engine EG.

The main radiator 52 is a radiator that radiates heat of the engine cooling water by exchanging heat with outside air. The heater core 53 is a heating heat exchanger that heats the air for air-conditioning of a passenger compartment by using the heat of the engine cooling water. In the main cooling circuit 50, the intercooler 10, the main radiator 52, and the heater core 53 are connected in parallel with each other.

The main cooling circuit 50 includes a bypass passage and an on-off valve (not shown) that opens and closes the bypass passage. The engine cooling water bypasses the main radiator 52, for example, by flowing through the bypass passage when the temperature of the engine cooling water is low (for example, 80 degrees Celsius or less). In the main cooling circuit 50, the temperature of the engine cooling water is adjusted to be between about 80 degrees Celsius and about 100 degrees Celsius by the bypass passage and the on-off valve.

If only the engine cooling water flows through the intercooler 10, the temperature of the supercharged intake air is not decreased to be at or below the temperature of the engine cooling water. That is, if only the engine cooling water flows through the intercooler 10, a lower limit of the temperature of the supercharged intake air may depend on the temperature of the engine cooling water. In such a configuration, when the temperature of the engine cooling water is high (for example, about 100 degrees Celsius), the supercharged intake air is not sufficiently cooled.

In contrast, the intercooler 10 of the present embodiment is connected to a sub-cooling circuit 60 in which sub-cooling water whose temperature is lower than that of the engine cooling water circulates, such that a coolant whose temperature is lower than that of the engine cooling water flows through the intercooler 10.

The sub-cooling circuit 60 is a cooling circuit in which the sub-cooling water whose temperature is lower than that of the engine cooling water flows. The intercooler 10 of the present embodiment cools the supercharged intake air by using the sub-cooling water as a second coolant. In addition, antifreeze liquid or water containing ethylene glycol etc. is adopted as the sub-cooling water.

In the sub-cooling circuit 60, a sub-circulation pump 61 that circulates the sub-cooling water and a sub-radiator 62 that radiates heat of the sub-cooling water by exchanging heat with the outside air are provided in addition to the intercooler 10. Unlike the main cooling circuit 50, the sub-cooling circuit 60 is not provided with a high temperature heating device such as the engine EG. Accordingly, the temperature the sub-cooling water flowing through the sub-cooling circuit 60 is lower than the engine cooling water (for example, at about 40 degrees Celsius). A heat exchange area of the sub-radiator 62 for exchanging heat with the outside air is made smaller than that of the main radiator 52 in view of the mountability to the vehicle. That is, the heat radiation capacity of the sub-radiator is smaller than that of the main radiator 52.

In the cooling system configured as described above, the intercooler 10 can sufficiently cool the supercharged intake air with the engine cooling water and the sub-cooling water that is lower in temperature than the engine cooling water. Accordingly, the cooling system of the present embodiment can sufficiently improve the charging efficiency of the intake air of the engine EG.

Next, the structure of the intercooler 10 of the present embodiment will be described in detail with reference to FIGS. 3 to 8. The intercooler 10 of the present embodiment is configured as a so-called drawn cup type heat exchanger.

Figure 3:
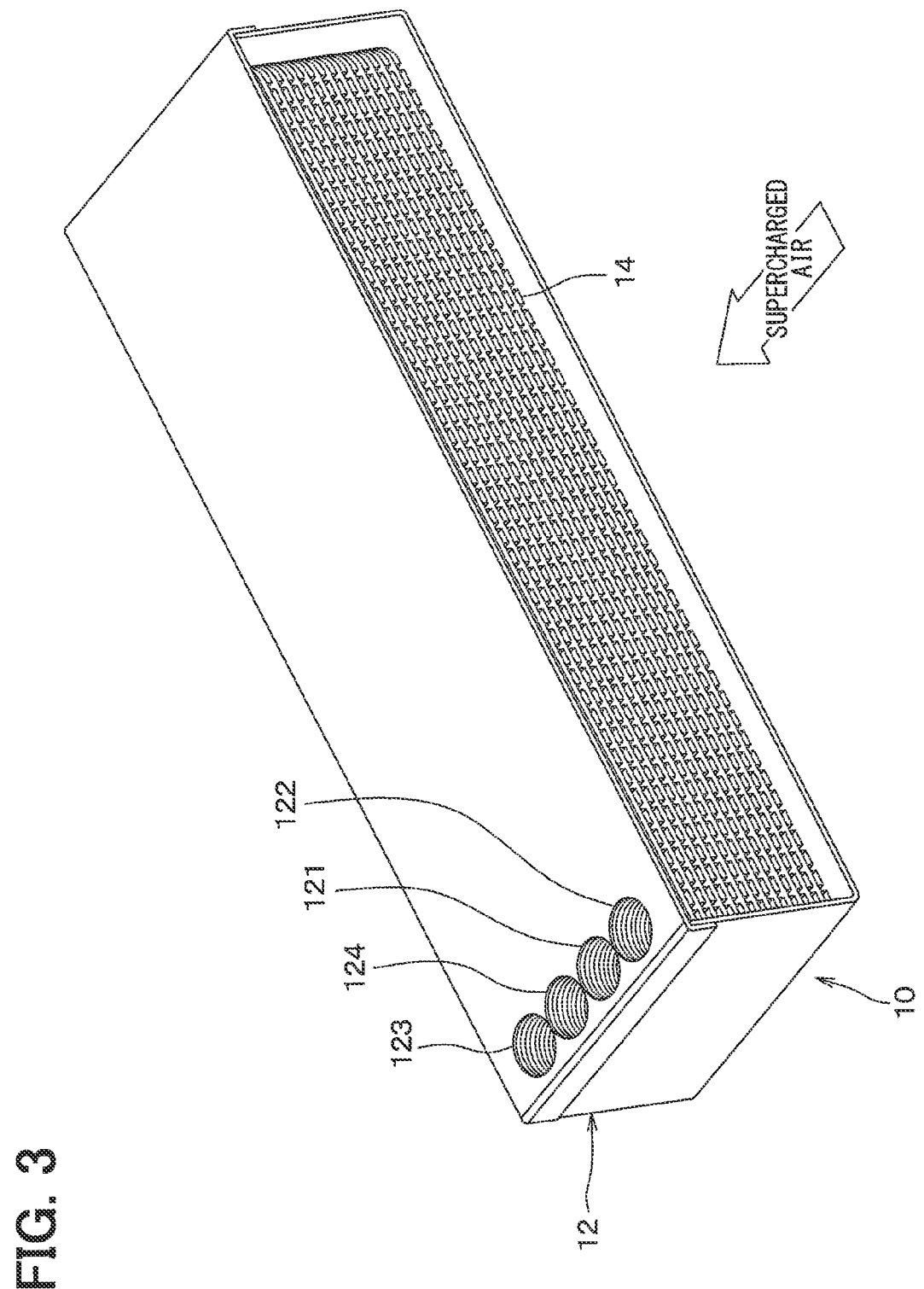
FIG. 3 is a perspective view schematically illustrating the intercooler of at least one embodiment.

As shown in FIG. 3, the intercooler 10 includes a casing 12 that is an outer body of the intercooler 10 and defines an air passage through which the supercharged intake air flows, and a heat exchange portion 14 housed in the casing 12.

All or some of the constituent parts of the intercooler 10 are formed of a clad material formed by cladding with a brazing material on the surface of a core material made of, for example, aluminum. The components of the intercooler 10 are brazed and bonded with each other by heating in a condition where the flux is applied to the surface of the clad material.

Figure 4:
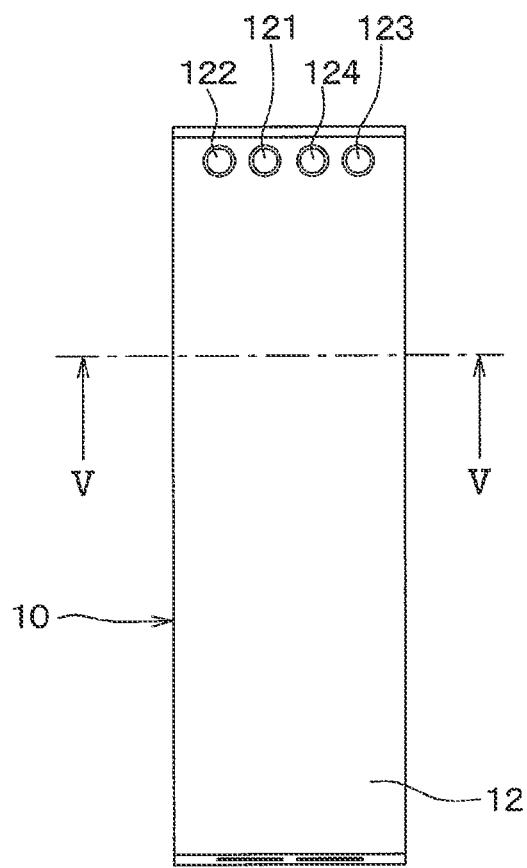
FIG. 4 is a top view schematically illustrating the intercooler of at least one embodiment.

As shown in FIGS. 3, 4, a first introducing portion 121 through which the engine cooling water flows into the heat exchange portion 14, and a first lead-out portion 122 through which the engine cooling water flows out of the heat exchange portion 14 are formed on an upper surface of the casing 12. In the casing 12 of the present embodiment, an inlet pipe (not shown) for the engine cooling water is connected to the first introducing portion 121, and an outlet pipe (not shown) for the engine cooling water is connected to the first lead-out portion 122.

A second introducing portion 123 through which the sub-cooling water flows into the heat exchange portion 14, and a second lead-out portion 124 through which the sub-cooling water flows out of the heat exchange portion 14 are formed on the upper surface of the casing 12. In the casing 12 of the present embodiment, an inlet pipe (not shown) for the sub-cooling water is connected to the second introducing portion 123, and an outlet pipe (not shown) for the sub-cooling water is connected to the second lead-out portion 124.

Figure 5:
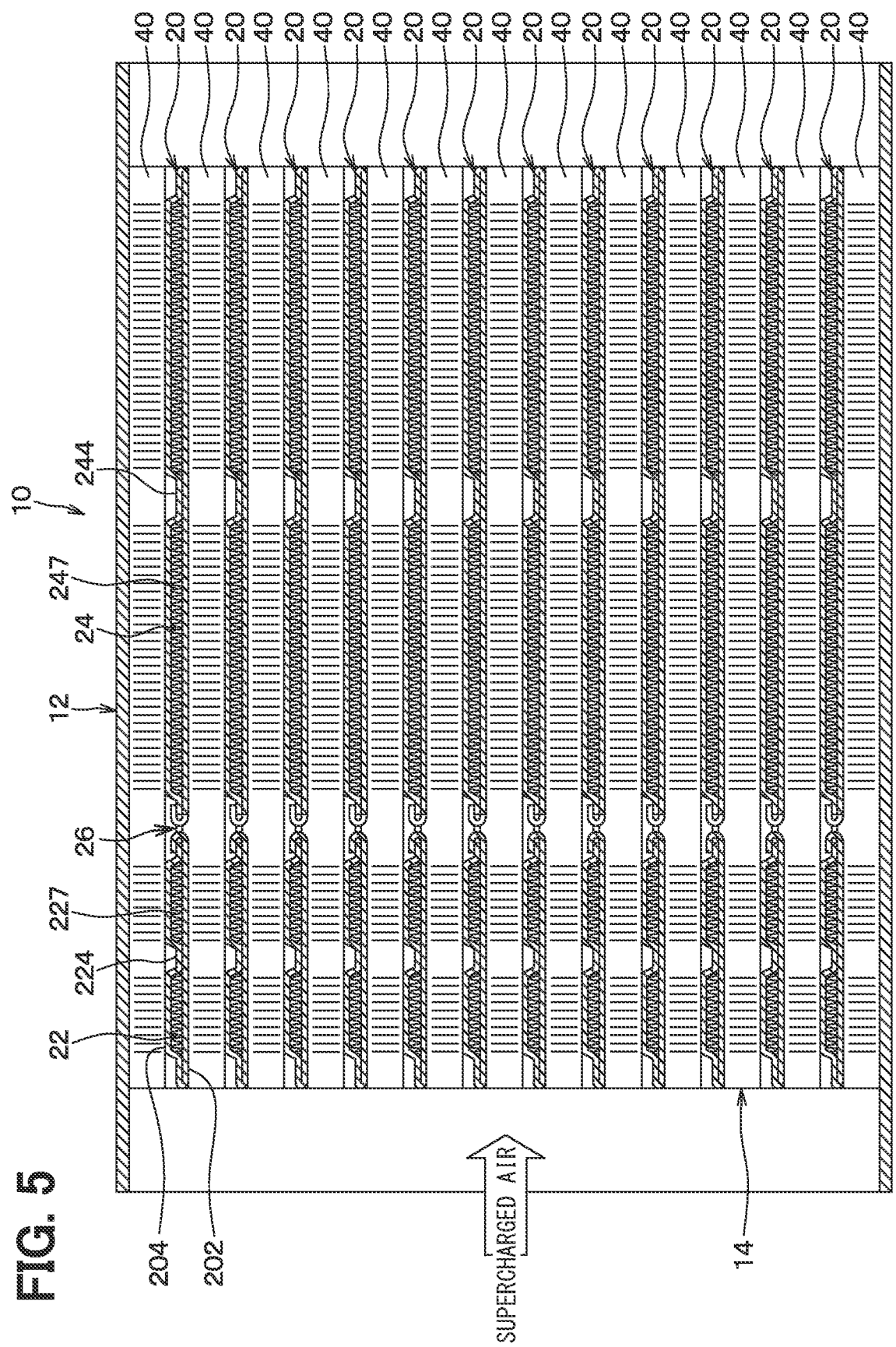
FIG. 5 is a cross-sectional view taken along line V-V of FIG. 4

The heat exchange portion 14 includes multiple cooling tubes 20, and outer fins 40 disposed between adjacent cooling tubes 20, as shown in FIG. 5. The heat exchange portion 14 is constituted by the stacked body in which the cooling tubes 20 and the outer fins 40 are alternately stacked with each other.

The cooling tube 20 defines therein an engine cooling water passage 22 through which the engine cooling water exchanging heat with the supercharged intake air flows, and a sub-cooling water passage 24 through which the sub-cooling water exchanging heat with the supercharged intake air flows.

The engine cooling water passage 22 and the sub-cooling water passage 24 are aligned with each other in a flow direction of the supercharged intake air. In the present embodiment, the engine cooling water passage 22 is located upstream of the sub-cooling water passage 24 with respect to the flow direction of the supercharged intake air.

The outer fin 40 functions as a heat exchange enhancing portion that enhances the heat exchange between the supercharged intake air and the engine cooling water, and the heat exchange between the supercharged intake air and the sub-cooling water. The outer fin 40 of the present embodiment is formed of a corrugated fin formed by bending a thin plate material into a wave shape. The outer fins 40 are bonded to mutually opposing portions of the adjacent cooling tubes 20 by brazing.

Figure 6:
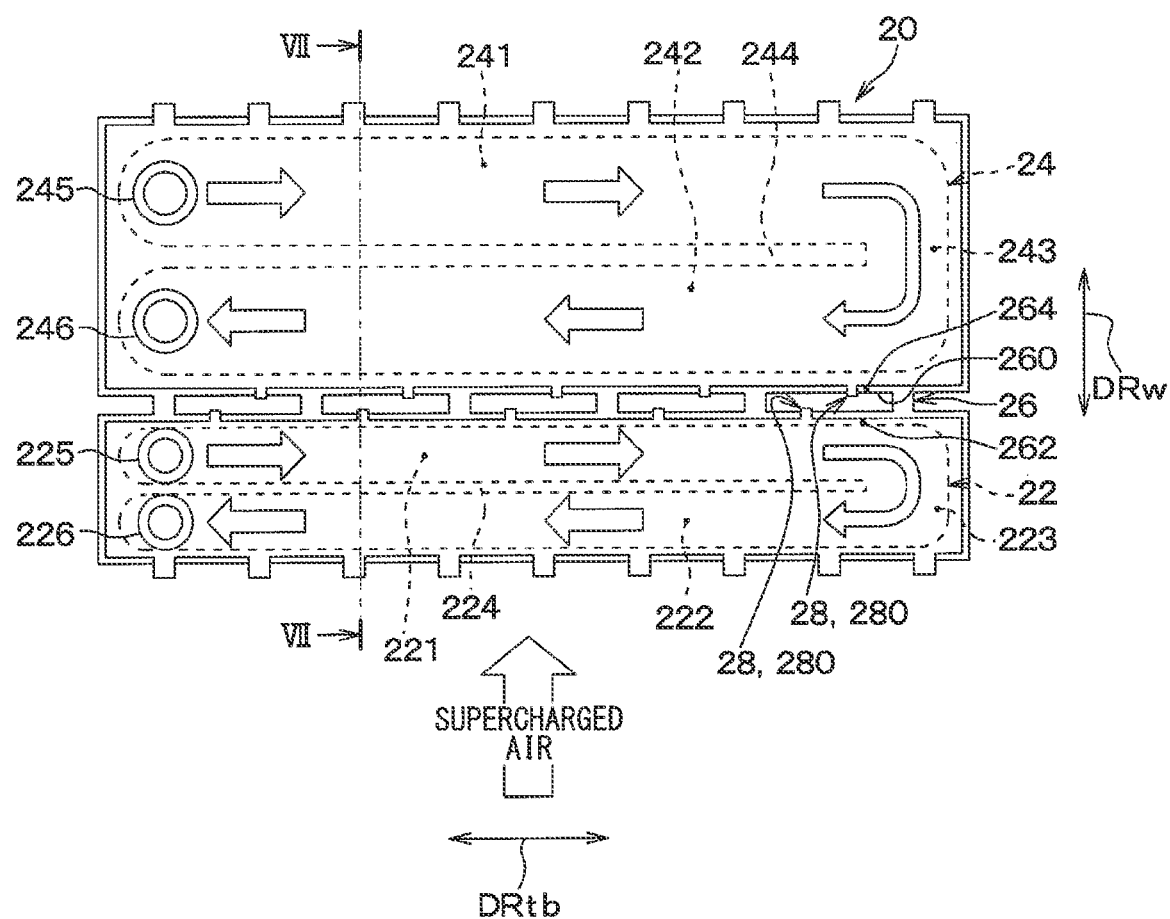
FIG. 6 is a top view schematically illustrating a cooling tube constituting the intercooler of at least one embodiment.

FIG. 6 is a top view schematically illustrating the cooling tube 20. In FIG. 6, the engine cooling water passage 22 and the sub-cooling water passage 24 are shown by dotted lines for convenience.

Figure 7:
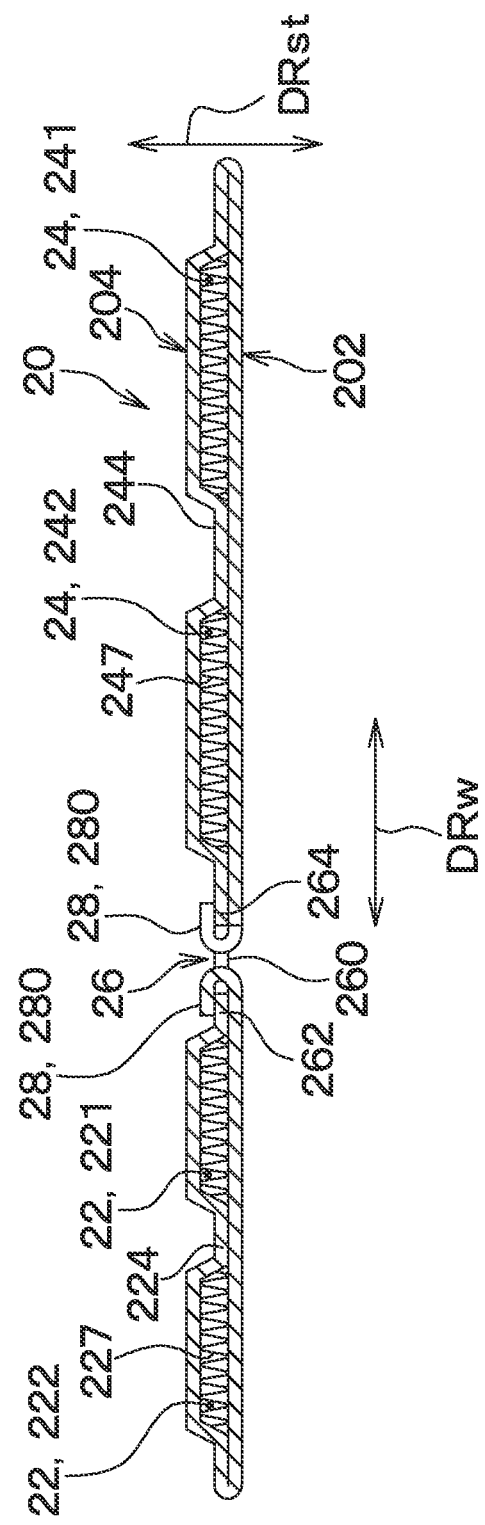
FIG. 7 is a cross-sectional view taken along a line VII-VII of FIG. 6.

In the present embodiment, as shown in FIG. 6, a longitudinal direction DRtb is a direction in which a long side of the cooling tube 20 extends, and a width direction DRw is a direction in which a short side of the cooling tube 20 extends. In the present embodiment, as shown in FIG. 7, a stacking direction DRst is a direction in which the cooling tubes 20 are stacked each other. This similarly applied to the drawings other than FIGS. 6, 7.

As shown in FIG. 6, the cooling tube 20 includes the engine cooling water passage 22 curved in a U-shape. In the present embodiment, the engine cooling water passage 22 is the first coolant passage through which the engine cooling water that is the first coolant flows.

The engine cooling water passage 22 includes a first upstream passage 221 extending along the longitudinal direction DRtb, a first downstream passage 222 extending along the longitudinal direction DRtb, and a first communication passage 223 through which the first upstream passage 221 and the first downstream passage 222 communicate with each other.

The first upstream passage 221 and the first downstream passage 222 are aligned in the width direction DRw. The first upstream passage 221 and the first downstream passage 222 are partitioned by a first partition portion 224 of the cooling tube 20.

A first inlet portion 225 through which the engine cooling water flows into the first upstream passage 221 is formed in a part of the cooling tube 20 that defines the first upstream passage 221. The first inlet portion 225 is located on one side of the first upstream passage 221 in the longitudinal direction DRtb. A first outlet portion 226 through which the engine cooling water flows out of the first downstream passage 222 is formed in a part of the cooling tube 20 that defines the first downstream passage 222. The first outlet portion 226 is located on one side of the first downstream passage 222 in the longitudinal direction DRtb.

The first inlet portion 225 and the first outlet portion 226 are cylinder portions protruding outward from the cooling tube 20 in the stacking direction DRst. Although not illustrated, the first inlet portions 225 of adjacent cooling tubes 20 are configured to be joined with each other. The first outlet portions 226 of adjacent cooling tubes 20 are configured to be joined with each other.

In the heat exchange portion 14 of the present embodiment, the first inlet portions 225 of the cooling tubes 20 connected with each other constitute a distribution tank portion that distributes the engine cooling water flowing through the inlet pipe (not shown) to the engine cooling water passages 22 of the cooling tubes 20. In the heat exchange portion 14 of the present embodiment, the first outlet portions 226 of the cooling tubes 20 connected with each other constitute a discharge tank portion through which the engine cooling water collected from the engine cooling water passages 22 of the cooling tubes 20 is discharged to an outside through the outlet pipe (not shown).

The first communication passage 223 is formed in the other end of the cooling tube 20 opposite from the first inlet portion 225 and the first outlet portion 226. The first communication passage 223 defines a turn portion in which the engine cooling water turns around in U-shape.

In the engine cooling water passage 22 of the present embodiment, an inner fin 227 is provided as shown in FIG. 7 to enhance the heat exchange between the engine cooling water and the supercharged intake air. The inner fin 227 is formed of a corrugated fin.

In the engine cooling water passage 22, the temperature of the engine cooling water flowing through the first downstream passage 222 is higher than the temperature of the engine cooling water flowing through the first upstream passage 221 due to the heat exchange between the engine cooling water and the supercharged intake air. That is, in the engine cooling water passage 22, the temperature of the engine cooling water flowing through the first upstream passage 221 is lower than the temperature of the engine cooling water flowing through the first downstream passage 222.

In the engine cooling water passage 22 of the present embodiment, the first upstream passage 221 is located downstream of the first downstream passage 222 with respect to the flow direction of the supercharged intake air in order to secure the temperature difference between the supercharged intake air and the engine cooling water.

As shown in FIG. 6, in the cooling tube 20, the sub-cooling water passage 24 curved into a U-shape is located downstream of the engine cooling water passage 22 with respect to the flow direction of the supercharged intake air. In the present embodiment, the sub-cooling water passage 24 is the second coolant passage through which the sub-cooling water that is the second coolant flows.

The engine cooling water passage 22 and the sub-cooling water passage 24 are separated by a passage partition portion 26 provided at a central portion of the cooling tube 20 in the width direction DRw. That is, in the cooling tube 20, the passage partition portion 26 separating the engine cooling water passage 22 from the sub-cooling water passage 24 is provided between the engine cooling water passage 22 and the sub-cooling water passage 24.

The sub-cooling water passage 24 includes a second upstream passage 241 extending along the longitudinal direction DRtb, a second downstream passage 242 extending along the longitudinal direction DRtb, and a second communication passage 243 through which the second upstream passage 241 and the second downstream passage 242 communicate with each other.

The second upstream passage 241 and the second downstream passage 242 are aligned in the width direction DRw. The second upstream passage 241 and the second downstream passage 242 are separated by a second partition portion 244 of the cooling tube 20.

A second inlet portion 245 through which the sub-cooling water flows into the second upstream passage 241 is formed in a part of the cooling tube 20 that defines the second upstream passage 241. The second inlet portion 245 is located on one side of the second upstream passage 241 in the longitudinal direction DRtb. A second outlet portion 246 through which the sub-cooling water flows out of the second downstream passage 242 is formed in a part of the cooling tube 20 that defines the second downstream passage 242. The second outlet portion 246 is located on one side of the second downstream passage 242 in the longitudinal direction DRtb.

The second inlet portion 245 and the second outlet portion 246 are cylinder portions protruding outward from the cooling tube 20 in the stacking direction DRst. The second inlet portions 245 of adjacent cooling tubes 20 are configured to be joined with each other. The second outlet portions 246 of adjacent cooling tubes 20 are configured to be joined with each other.

In the heat exchange portion 14 of the present embodiment, the second inlet portions 245 of the cooling tubes 20 connected with each other constitute a distribution tank portion that distributes the sub-cooling water flowing through the inlet pipe (not shown) to the sub-cooling water passages 24 of the cooling tubes 20. In the heat exchange portion 14 of the present embodiment, the second outlet portions 246 of the cooling tubes 20 connected with each other constitute a discharge tank portion through which the sub-cooling water collected from the sub-cooling water passages 24 of the cooling tubes 20 is discharged to an outside through the outlet pipe (not shown).

The second communication passage 243 is formed on the other end of the cooling tube 20 opposite from the second inlet portion 245 and the second outlet portion 246. The second communication passage 243 defines a turn portion in which the sub-cooling water turns around in U-shape.

In the sub-cooling water passage 24 of the present embodiment, an inner fin 247 is provided as shown in FIG. 7 to enhance the heat exchange between the sub-cooling water and the supercharged intake air. The inner fin 247 is formed of a corrugated fin.

In the sub-cooling water passage 24, the temperature of the sub-cooling water flowing through the second downstream passage 242 is higher than the temperature of the sub-cooling water flowing through the second upstream passage 241 due to the heat exchange between the sub-cooling water and the supercharged intake air. That is, in the sub-cooling water passage 24, the temperature of the sub-cooling water flowing through the second upstream passage 241 is lower than the temperature of the sub-cooling water flowing through the second downstream passage 242.

In the sub-cooling water passage 24 of the present embodiment, the second upstream passage 241 is located downstream of the second downstream passage 242 in the flow direction of the supercharged intake air in order to secure the temperature difference between the supercharged intake air and the sub-cooling water.

Since a pair of plate portions 202, 204 having a predetermined shape are bonded by brazing in a state where the plate portions 202, 204 are stacked with each other, the cooling water passages 22, 24 are defined between a pair of plate portion 202, 204, as shown in FIG. 7.

The cooling tube 20 of the present embodiment is brazed in a condition where a first plate portion 202 having a flat shape and a second plate portion 204 having a passage groove defining the cooling water passages 22, 24 are pressed to contact each other.

In the cooling tube 20 having such a structure, the passage partition portion 26 which separates the cooling water passages 22, 24 is provided at a center part in the plate portions 202, 204. Therefore, it may be difficult to press the plate portions 202, 204 at the passage partition portion 26, and accordingly the brazing may be insufficient. If the brazing at the passage partition portion 26 is insufficient, it is not preferable because the cooling water may be likely to leak from the cooling tube 20.

In view of the above points, the cooling tube 20 of the present embodiment includes through-holes 260 having a slit shape extending through the passage partition portion 26 in the stacking direction DRst, and a swaged portion 28 pressing a pair of plate portions 202, 204 to contact with each other is provided on the periphery of the through-hole 260.

As shown in FIG. 6, five through-holes 260 are formed in the passage partition portion 26 of the present embodiment. The swaged portion 28 is provided at a first peripheral portion 262 that is a part of the periphery of the through-hole 260 close to the engine cooling water passage 22 and at a second peripheral portion 264 that is a part of the periphery of the through-hole 260 close to the sub-cooling water passage 24.

In the present embodiment, one swaged portion 28 is provided at each of the first peripheral portion 262 and the second peripheral portion 264. In the present embodiment, the swaged portion 28 is a claw portion 280 formed integrally with the first plate portion 202.

It may be assumed that the swaged portions 28 are provided at a part of the first peripheral portion 262 and a part of the second peripheral portion 264 so as to face each other. That is, it may be assumed that the swaged portion 28 provided in the first peripheral portion 262 and the swaged portion 28 provided in the second peripheral portion 264 are positioned to face with each other in the width direction DRw.

However, if the swaged portions 28 are positioned in the first peripheral portion 262 and the second peripheral portion 264 so as to face each other, the swaged portions 28 may be close to each other. This is not preferable because it may become a factor that makes the cooling tube 20 difficult to manufacture.

It may be assumed to increase the size of the through-hole 260 of the passage partition portion 26 in the width direction DRw so as to avoid the situation where the swaged portions 28 are close to each other in the width direction. However, it may increase the size of the intercooler 10.

In view of the above points, in the present embodiment, the swaged portions 28 are positioned in the first peripheral portion 262 and the second peripheral portion 264 so as not to face each other. That is, in the cooling tube 20 of the present embodiment, the swaged portion 28 provided in the first peripheral portion 262 and the swaged portion 28 provided in the second peripheral portion 264 are positioned not to face with each other in the width direction DRw. That is, in the cooling tube 20 of the present embodiment, the swaged portion 28 provided in the first peripheral portion 262 and the swaged portion 28 provided in the second peripheral portion 264 are positioned to be offset from each other in the longitudinal direction DRtb.

Figure 8:
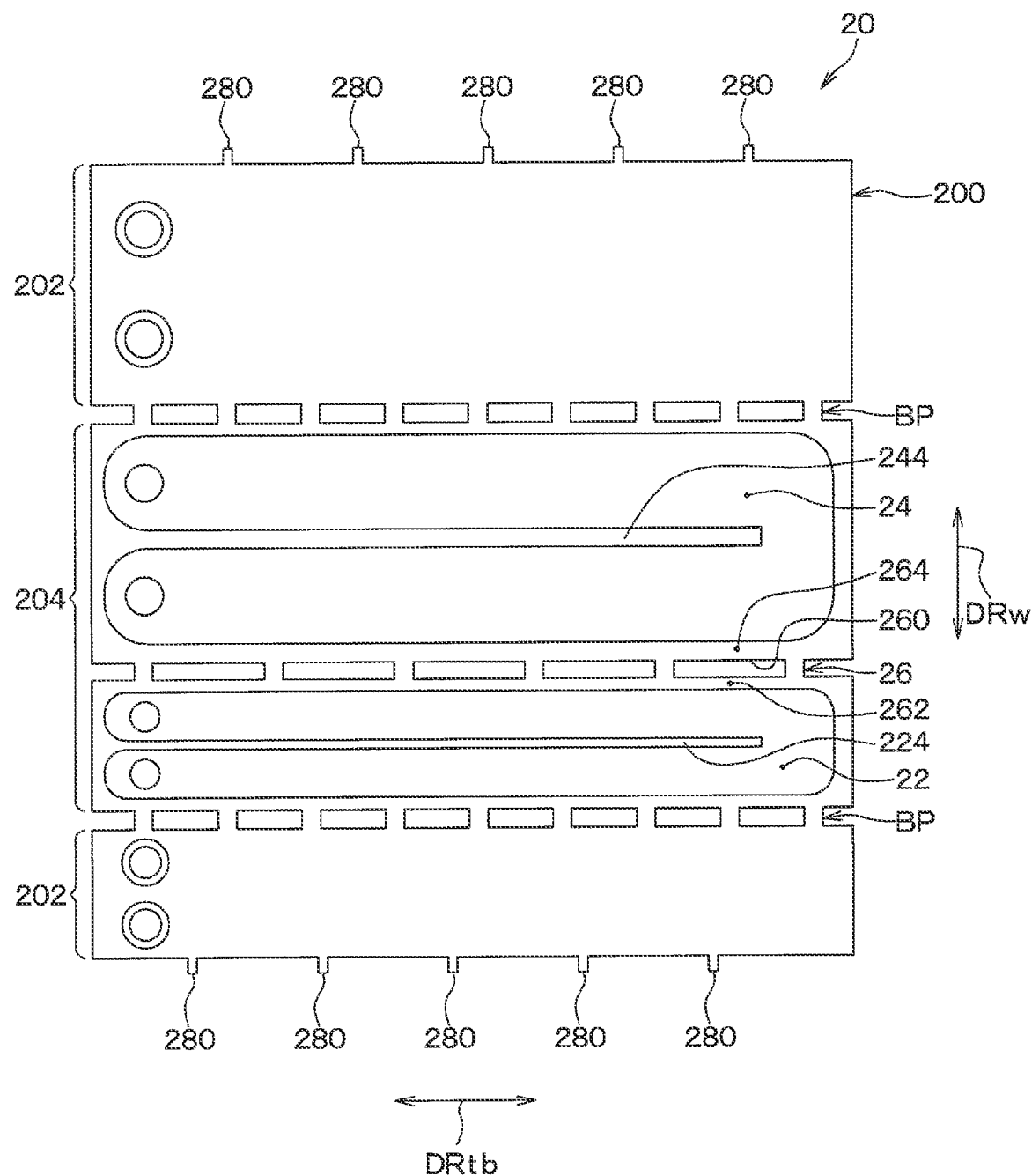
FIG. 8 is a developed view schematically illustrating the cooling tube according to at least one embodiment.

FIG. 8 is a developed diagram schematically illustrating a pair of plate portions 202, 204 constituting the outer body of the cooling tube 20 of the present embodiment. A pair of plate portions 202, 204 of the present embodiment are formed of one plate 200 shown in FIG. 8.

The plate 200 of the present embodiment has two bent portions BP. Through-holes having a slit shape aligned in the longitudinal direction DRtb are formed in the bent portion BP to be easily bent.

In the present embodiment, the second plate portion 204 having the passage groove is constituted by an intermediate part of the plate 200 between two bent portions BP. In the second plate portion 204, the through-holes 260 are located between the passage groove defining the engine cooling water passage 22 and the passage groove defining the sub-cooling water passage 24.

In the present embodiment, the first plate portion 202 having a flat shape is constituted by a pair of outside parts of the plate 200 located outside the two bent portions BP. The first plate portion 202 has the claw portions 280 constituting the swaged portions 28 at a portion opposite to the bent portions BP, which faces the through-holes 260 when the plate 200 is bent at the bent portion BP.

Hereinafter, the manufacturing method of the intercooler 10 of this embodiment including the forming method of the cooling tube 20 is explained. The method of forming the cooling tube 20 will be described with reference to FIGS. 9 to 14.

Figure 9:
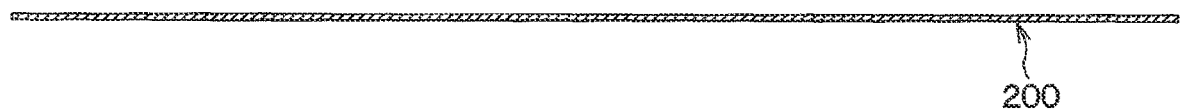
FIG. 9 is a diagram for explaining a preparation step in forming the cooling tube of at least one embodiment.

First, in a preparation step of the forming method of the cooling tube 20, one plate 200 that constitutes a pair of plate portions 202, 204 of the cooling tube 20 is provided as shown in FIG. 9. The plate 200 is made of, for example, a clad material in which a brazing material is clad on the surface of a core material made of aluminum.

Figure 10:
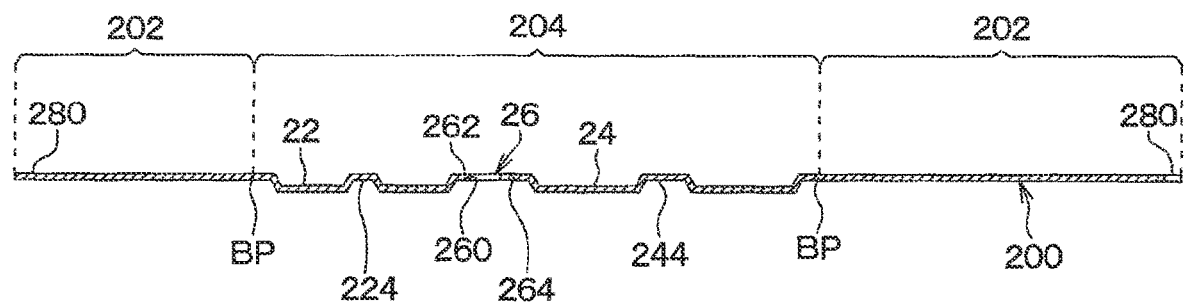
FIG. 10 is a diagram for explaining the preparation step in forming the cooling tube of at least one embodiment.

In the preparation step, the passage grooves of the engine cooling water passage 22 and the sub-cooling water passage 24, the bent portions BP, the through-holes 260, and the claw portions 280 constituting the swaged portions 28 are formed by pressing, for example, at predetermined portions of the plate 200 shown in FIG. 9, as shown in FIG. 10.

Figure 11:
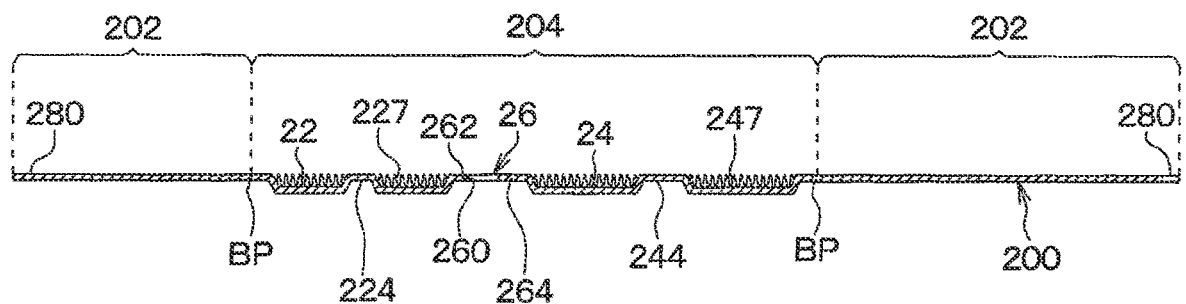
FIG. 11 is a diagram for explaining the preparing step in forming the cooling tube of at least one embodiment.

Further, in the preparation step, the inner fins 227, 247 are placed, as shown in FIG. 11, on the plate 200 in which the passage grooves of the engine cooling water passage 22 and the sub-cooling water passage 24 shown in FIG. 10 are formed. In the present embodiment, a corrugated fin which is shaped by bending a thin-plate metal into a wave shape by roller forming method, for example, is used as the inner fins 227, 247.

Figure 12:
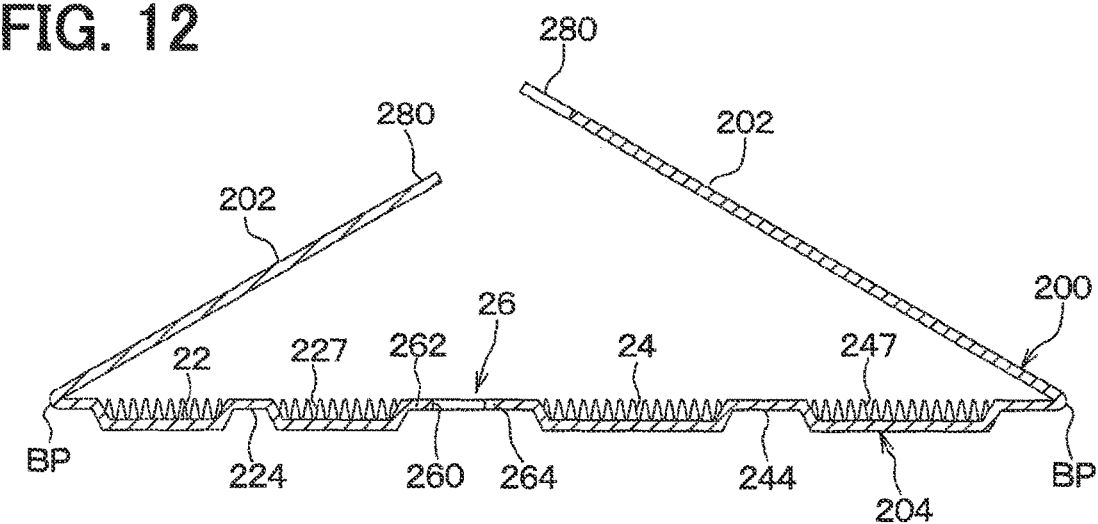
FIG. 12 is a diagram for explaining a temporary assembling step in forming the cooling tube of at least one embodiment.

Subsequently, in a temporary assembling step of the forming method of the cooling tube 20, the bent portions BP of the plate 200 shown in FIG. 11 are bent by bending so as to overlap the first plate portion 202 and the second plate portion 204, as shown in FIG. 12.

Figure 13:
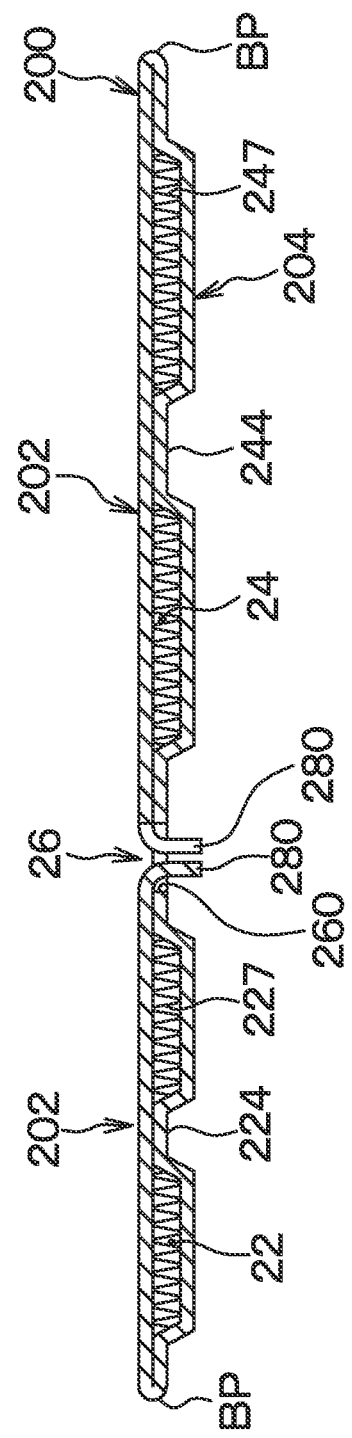
FIG. 13 is a diagram for explaining the temporary assembling step in forming the cooling tube of at least one embodiment.

In the temporary assembling step, the claw portions 280 constituting the swaged portions 28 are inserted into the through-holes 260 of the plate 200, as shown in FIG. 13. In the temporary assembling step, the claw portions 280 are plastically deformed so as to crimp the first plate portion 202 and the second plate portion 204 at the passage partition portion 26, as shown in FIG. 14.

The cooling tube 20 of the present embodiment is formed by the above-described method. The forming method of the cooling tube 20 described above is an example, and the cooling tube 20 may be formed by another method.

Figure 14:
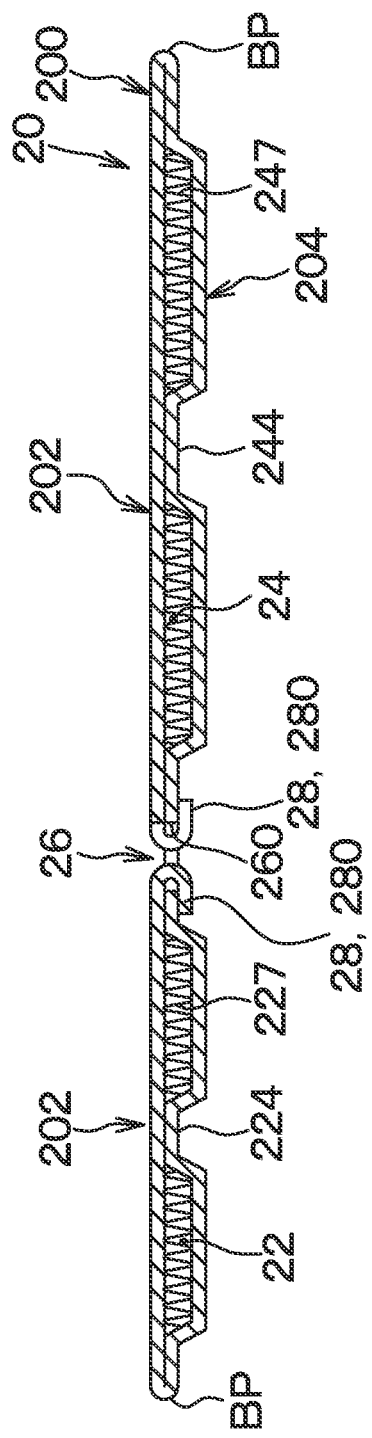
FIG. 14 is a diagram for explaining the temporary assembling step in forming the cooling tube of at least one embodiment.

In a subsequent step, a stacked body in which the cooling tubes 20 shown in FIG. 14 and the outer fins 40 are alternately stacked with each other is housed in the casing 12. That is, the stacked body of the cooling tubes 20 and the outer fins 40 is assembled with the casing 12 in this step.

In a subsequent step, the stacked body of the cooling tubes 20 and the outer fins 40 is bonded to the casing 12 by brazing. Specifically, in this step, the assembled body which includes the casing 12 and the stacked body of the cooling tubes 20 and the outer fins 40 is heated to a temperature higher than the melting point of the brazing material covering the components to bond the components with each other by brazing in a vacuum heating furnace, or an active furnace with an inert atmosphere, for example.

In the intercooler 10 of the above-described present embodiment, the through-holes 260 are formed in the passage partition portion 26 of the cooling tube 20, and the swaged portions 28 for crimping a pair of plate portions 202, 204 are formed in a periphery of the through-holes 260.

According to this, since a pair of plate portions 202, 204 constituting the cooling tube 20 of the intercooler 10 are sufficiently crimped at the passage partition portion 26, the bonding failure of a pair of plate portions 202, 204 at the passage partition portion 26 can be suppressed. According to the intercooler 10 of the present embodiment, the leakage of the engine cooling water and the sub-cooling water from the cooling tube 20 can be sufficiently suppressed.

In a configuration in which the engine cooling water and the sub-cooling water whose temperatures are different from each other flow through single cooling tube 20, the heat of the engine cooling water may be transferred to the sub-cooling water through the passage partition portion 26 separating the engine cooling water passage 22 from the sub-cooling water passage 24.

As described above, the radiation capacity of the sub-radiator 62 of the present embodiment is lower than that of the main radiator 52. Accordingly, if the heat of the engine cooling water is transferred to the sub-cooling water and the temperature of the sub-cooling water increases, the heat radiation from the sub-cooling water in the sub-radiator 62 may be insufficient. When the heat radiation from the sub-cooling water in the sub-radiator 62 is insufficient, the temperature of the sub-cooling water flowing into the intercooler 10 increases, and accordingly the capacity of the intercooler 10 for cooling the supercharged intake air may decrease. That is, the unnecessary heat exchange between the engine cooling water and the sub-cooling water through the passage partition portion 26 in the cooling tube 20 may be undesirable because it may cause the decrease of the efficiency in cooling of the supercharged intake air by the intercooler 10.

In contrast, since the cooling tube 20 of the present embodiment has the through-holes 260 in the passage partition portion 26, the unnecessary heat exchange between the engine cooling water and the sub-cooling water through the passage partition portion 26 can be limited. That is, according to the intercooler 10 of the present embodiment, the cooling efficiency of the supercharged intake air can be improved by limiting the unnecessary heat exchange between the engine cooling water and the sub-cooling water.

In the intercooler 10 of the present embodiment, the swaged portions 28 are positioned in the first peripheral portion 262 and the second peripheral portion 264 of the periphery of the through-hole 260 of the passage partition portion 26 so as not to face each other.

According to this, the swaged portions 28 can be avoided to be too close to each other without increasing the size of the through-hole 260 of the passage partition portion 26. That is, according to the intercooler 10 of the present embodiment, the leakage of the engine cooling water and the sub-cooling water from the cooling tube 20 can be suppressed while the increase of the size of the intercooler 10 is suppressed.

In the present embodiment, the swaged portion 28 is constituted by the claw portion 280 that is formed integrally with the first plate portion 202, in a pair of plate portions 202, 204 constituting the cooling tube 20.

Since the swaged portion 28 is constituted by the claw portion 280 provided in the first plate portion 202, the number of the components of the intercooler 10 can be reduced compared to a case where the swaged portion 28 is provided as a component separated from a pair of plate portions 202, 204. That is, according to the intercooler 10 of the present embodiment, the leakage of the engine cooling water and the sub-cooling water from the cooling tube 20 can be suppressed without increasing the number of the components.

Specifically, according to the cooling tube 20 of the present embodiment, a pair of plate portions 202, 204 constituting the cooling tube 20 are formed of one plate 200. Since a pair of plate portions 202, 204 of the cooling tube 20 are formed of one plate 200, the number of the components of the cooling tube 20 can be reduced compared to a case where a pair of plate portions 202, 204 are provided separately. That is, according to the intercooler 10 of the present embodiment, the leakage of the engine cooling water and the sub-cooling water from the cooling tube 20 can be suppressed without increasing the number of the components.

Modification of First Embodiment

In the above-described first embodiment, the second plate portion 204 is a part of one plate 200 between two bent portions BP, and the first plate portion 202 is constituted by the outside parts located outside the bent portions BP. However, the present disclosure is not limited to this.

For example, in the cooling tube 20, the first plate portion 202 may be a part of one plate 200 between the two bent portions BP, and the second plate portion 204 may be constituted by the outside parts located outside the two bent portions BP.

The cooling tube 20 may be constituted by a plate having one bent portion BP. That is, in the cooling tube 20, the first plate portion 202 may be a part of the plate on one side of the bent portion BP in the width direction DRw, and the second plate portion 204 may be a part of the plate on the other side of the bent portion BP in the width direction DRw.

Second Embodiment

Next, a second embodiment will be described with reference to FIGS. 15, 16. The present embodiment is different from the first embodiment in that a swaged portion 28A is formed in the second plate portion 204 instead of the first plate portion 202.

Figure 15:
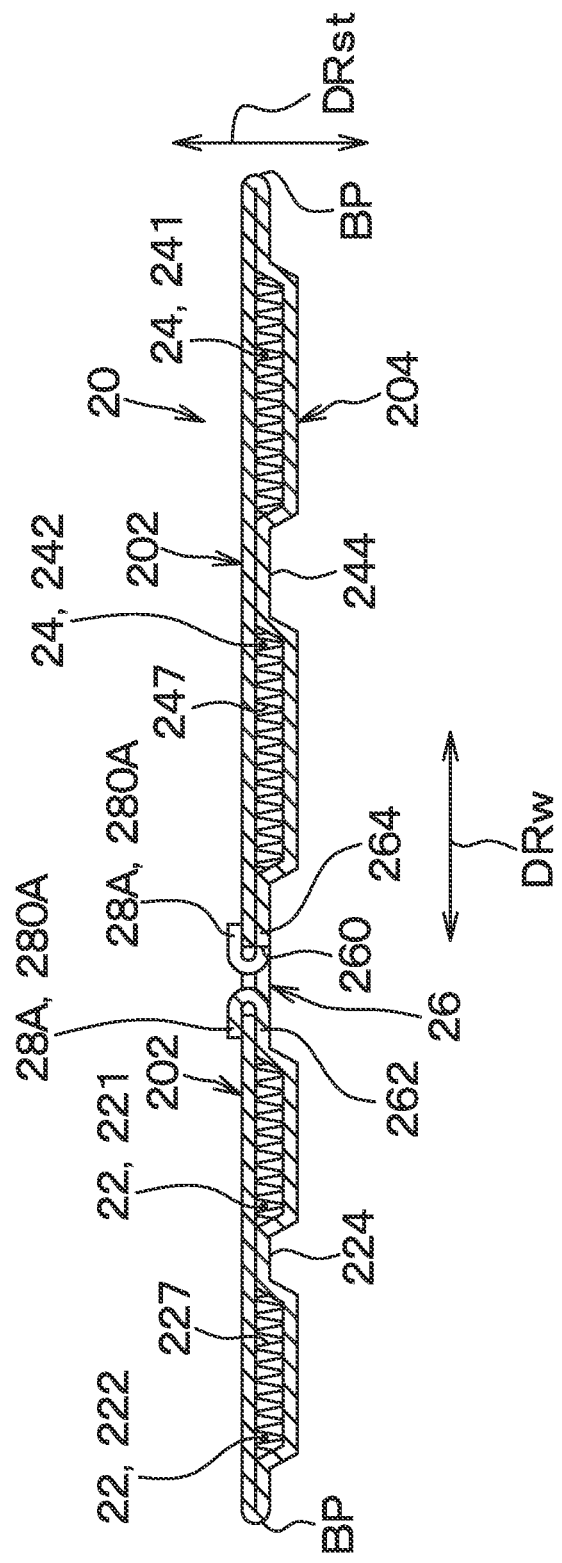
FIG. 15 is a cross-sectional diagram schematically illustrating a cooling tube according to at least one embodiment.

As shown in FIG. 15, in the cooling tube 20 of the present embodiment, a claw portion 280A constituting the swaged portion 28A is not provided at the periphery of the through-hole 260 of the second plate portion 204, not in the first plate portion 202.

Figure 16:
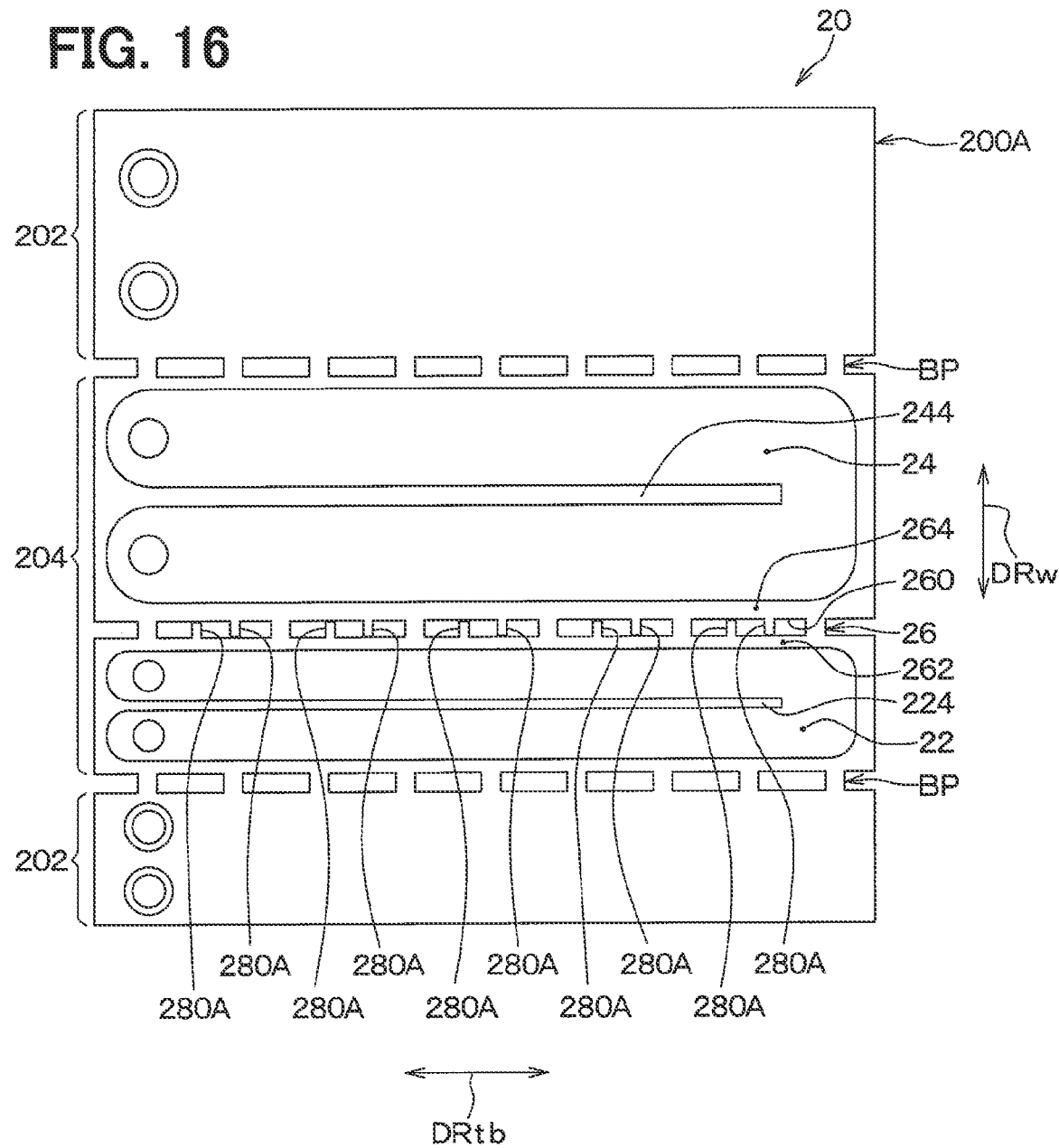
FIG. 16 is a developed view schematically illustrating the cooling tube according to at least one embodiment.

FIG. 16 is a developed diagram schematically illustrating a pair of plate portions 202, 204 constituting the outer body of the cooling tube 20 of the present embodiment. A pair of plate portions 202, 204 of the present embodiment are formed of one plate 200A shown in FIG. 16.

The plate 200A of the present embodiment has two bent portions BP. Through-holes having a slit shape aligned in the longitudinal direction DRtb are formed in the bent portion BP to be easily bent.

In the present embodiment, the first plate portion 202 having a flat shape is constituted by a pair of outside parts of the plate 200A located outside the two bent portions BP. Unlike the first embodiment, the first plate portion 202 of the present embodiment is not provided with the claw portions 280 that constitute the swaged portion 28.

In the present embodiment, the second plate portion 204 having the passage groove is constituted by an intermediate part of the plate 200A between two bent portions BP. In the second plate portion 204, the through-holes 260 are located between the passage groove defining the engine cooling water passage 22 and the passage groove defining the sub-cooling water passage 24. In the second plate portion 204, the claw portion 280A constituting the swaged portion 28A is provided in the periphery of the through-hole 260. The claw portions 280A constituting the swaged portions 28A are positioned in the first peripheral portion 262 and the second peripheral portion 264 of the passage partition portion 26 so as not to face each other.

The other configuration is the same as that of the first embodiment. The intercooler 10 of the present embodiment can achieve the same effects and advantages as the first embodiment, which can be obtained from the structure common to the intercooler 10 of the first embodiment. In the intercooler 10 of the above-described embodiment, the through-holes 260 are formed in the passage partition portion 26 of the cooling tube 20, and the swaged portions 28A for crimping a pair of plate portions 202, 204 are formed around the through-holes 260. According to the intercooler 10 of the present embodiment, the leakage of the engine cooling water and the sub-cooling water from the cooling tube 20 can be sufficiently suppressed.

Third Embodiment

Next, a third embodiment will be described with reference to FIGS. 17 and 18. The present embodiment is different from the first embodiment in that a swaged portion 28B is formed in both the second plate portion 204 and the first plate portion 202.

Figure 17:
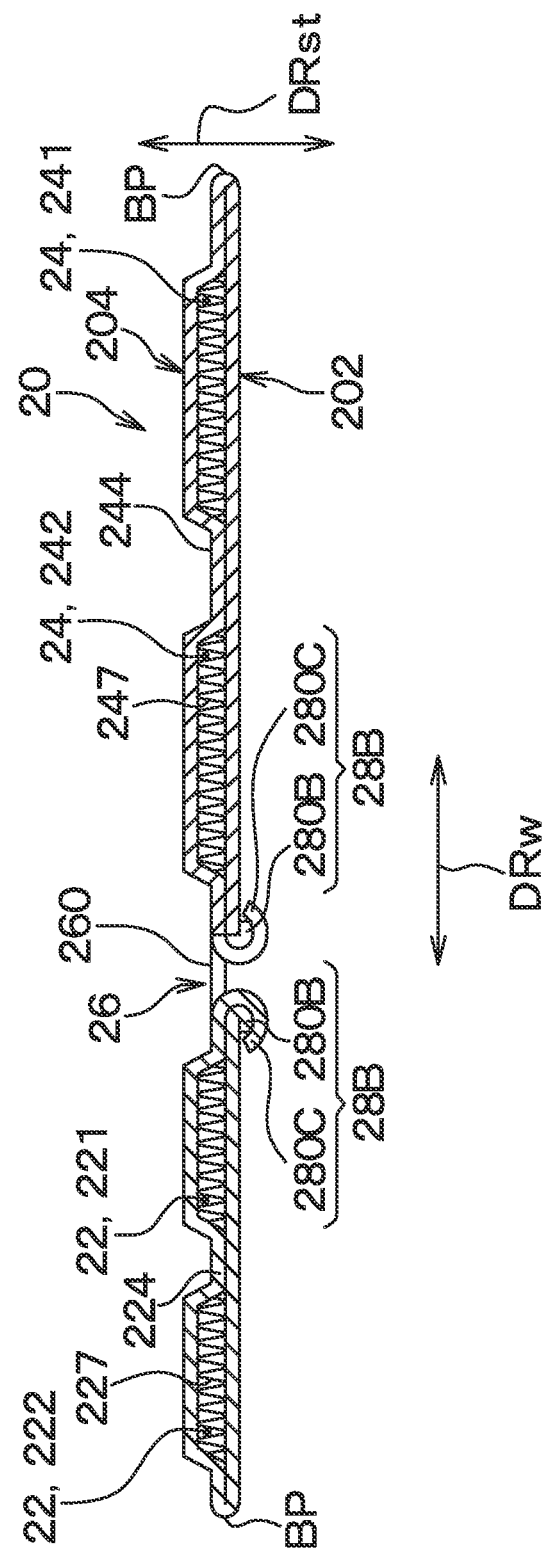
FIG. 17 is a cross-sectional diagram schematically illustrating a cooling tube according to a third embodiment.

As shown in FIG. 17, in the cooling tube 20 of the present embodiment, claw portions 280B, 280C constituting the swaged portions 28B are provided in the first plate portion 202 and the second plate portion 204 at the periphery of the through-hole 260. That is, the swaged portion 28B of the present embodiment is constituted by a first claw portion 280B provided in the first plate portion 202 and a second claw portion 280C provided in the second plate portion 204.

The swaged portion 28B of the present embodiment is a part in which the first claw portion 280B and the second claw portion 280C stacked with each other are plastically deformed. In the swaged portion 28B, the second claw portion 280C is plastically deformed to cover the outside of the first claw portion 280B. It is preferable that the second claw portion 280C is longer than the first claw portion 280B in the width direction DRw.

Figure 18:
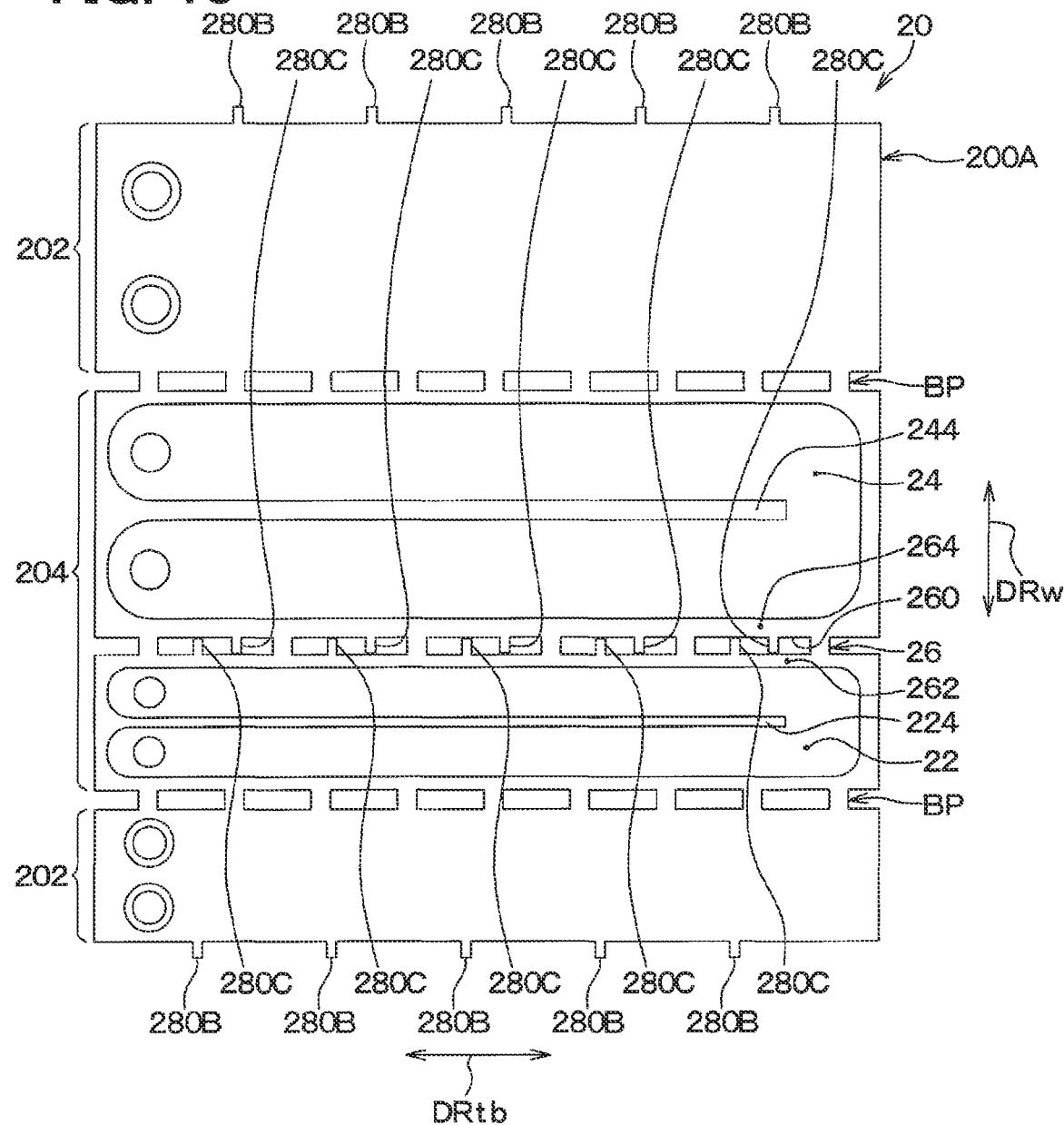
FIG. 18 is a developed view schematically illustrating the cooling tube according to at least one embodiment.

FIG. 18 is a developed diagram schematically illustrating a pair of plate portions 202, 204 constituting the outer body of the cooling tube 20 of the present embodiment. A pair of plate portions 202, 204 of the present embodiment are formed of one plate 200B shown in FIG. 18.

The plate 200B of the present embodiment has two bent portions BP. Through-holes having a slit shape aligned in the longitudinal direction DRtb are formed in the bent portion BP to be easily bent.

In the present embodiment, the first plate portion 202 having a flat shape is constituted by a pair of outside parts of the plate 200B located outside the two bent portions BP. The first plate portion 202 has the first claw portions 280B constituting the swaged portions 28 at an opposite end opposite from the bent portions BP, which faces the through-holes 260 when the plate 200B is bent at the bent portion BP.

In the present embodiment, the second plate portion 204 having the passage groove is constituted by an intermediate part of the plate 200B between two bent portions BP. In the second plate portion 204, the through-holes 260 are located between the passage groove defining the engine cooling water passage 22 and the passage groove defining the sub-cooling water passage 24. In the second plate portion 204, the second claw portion 280C constituting the swaged portion 28B is provided at the periphery of the through-hole 260.

The second claw portions 280C constituting the swaged portions 28B are positioned in the first peripheral portion 262 and the second peripheral portion 264 of the passage partition portion 26 so as not to face each other. The second claw portion 280C is provided at a position to overlap the first claw portion 280B in the width direction DRw.

The other configuration is the same as that of the first embodiment. The intercooler 10 of the present embodiment can achieve the same effects and advantages as the first embodiment, which can be obtained from the structure common to the intercooler 10 of the first embodiment. In the intercooler 10 of the above-described embodiment, the through-holes 260 are formed in the passage partition portion 26 of the cooling tube 20, and the swaged portions 28B for crimping a pair of plate portions 202, 204 are formed around the through-holes 260. According to the intercooler 10 of the present embodiment, the leakage of the engine cooling water and the sub-cooling water from the cooling tube 20 can be sufficiently suppressed.

In the present embodiment, since the swaged portion 28B is constituted by a part in which the first claw portion 280B and the second claw portion 280C superposed on each other are plastically deformed, a pair of plate portions 202, 204 can be sufficiently crimped at the passage partition portion 26.

Modification of Third Embodiment

Figure 19:
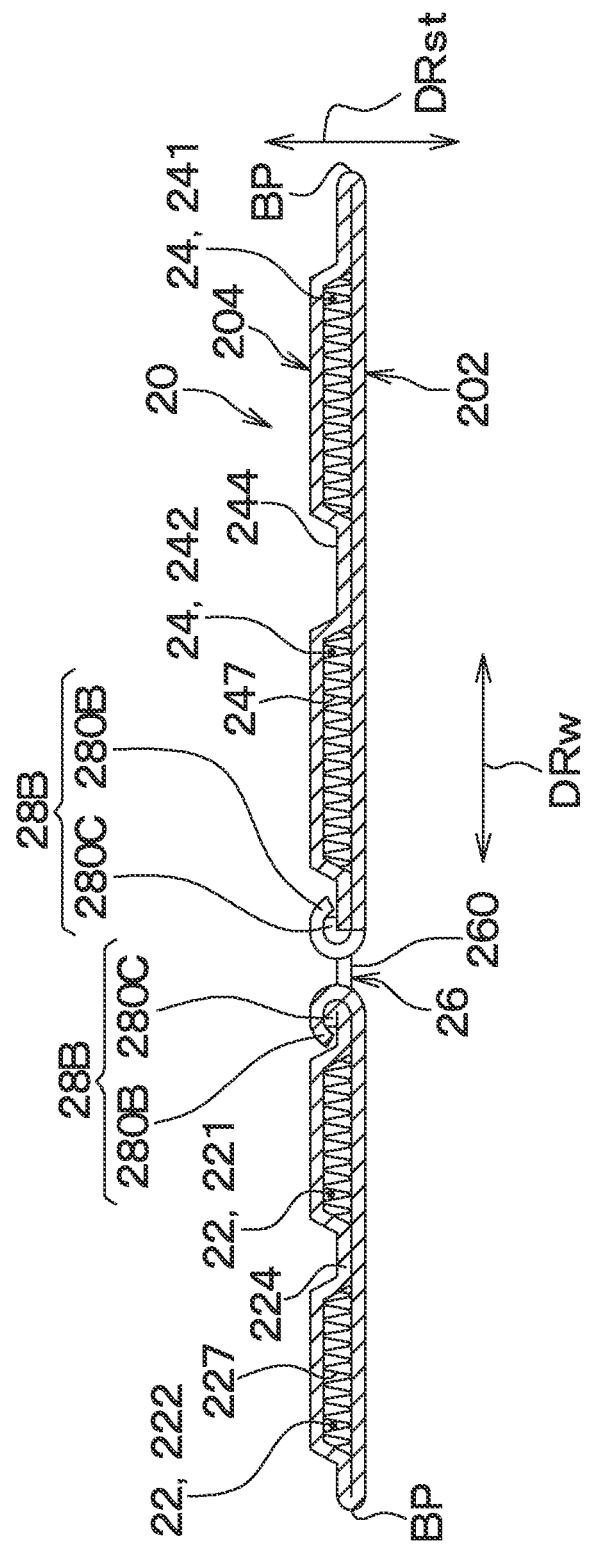
FIG. 19 is a cross-sectional diagram schematically illustrating a main part of a cooling tube according to a modification example of at least one embodiment.

In the above-described third embodiment, the swaged portion 28B is constituted by a part in which the second claw portion 280C is plastically deformed to cover the outside of the first claw portion 280B. However, the present disclosure is not limited to this. The swaged portion 28B may be constituted by a part in which the first claw portion 280B is plastically deformed to cover the outside of the second claw portion 280C, as shown in FIG. 19. In this case, it is preferable that the first claw portion 280B is longer than the second claw portion 280C in the width direction DRw.

Fourth Embodiment

Next, a fourth embodiment will be hereinafter described with reference to FIGS. 20 to 25. The present embodiment is different from the first embodiment in that a pair of plate portions 202A, 204A constituting the cooling tube 20 is formed of two plates 200C, 200D.

Figure 20:
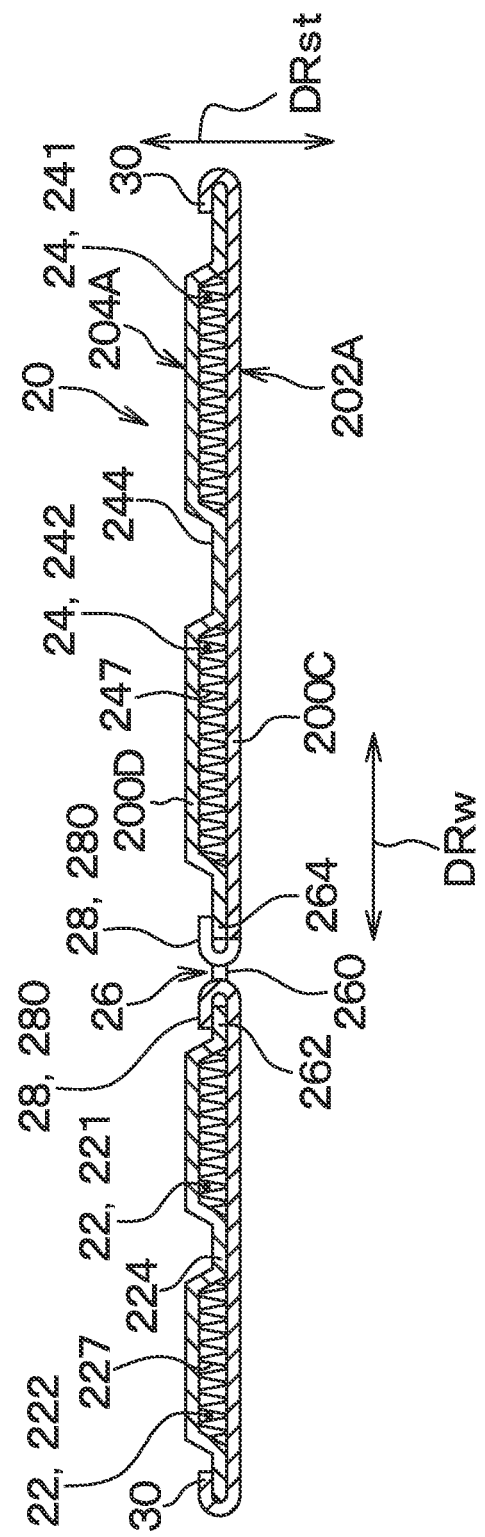
FIG. 20 is a cross-sectional diagram schematically illustrating a cooling tube according to at least one embodiment.

As shown in FIG. 20, in the cooling tube 20 of the present embodiment, the engine cooling water passage 22 and the sub-cooling water passage 24 are formed by bonding the first plate portion 202A and the second plate portion 204A by brazing in a condition where the first plate portion 202A and the second plate portion 204A separately provided are superposed on each other.

Figure 21:
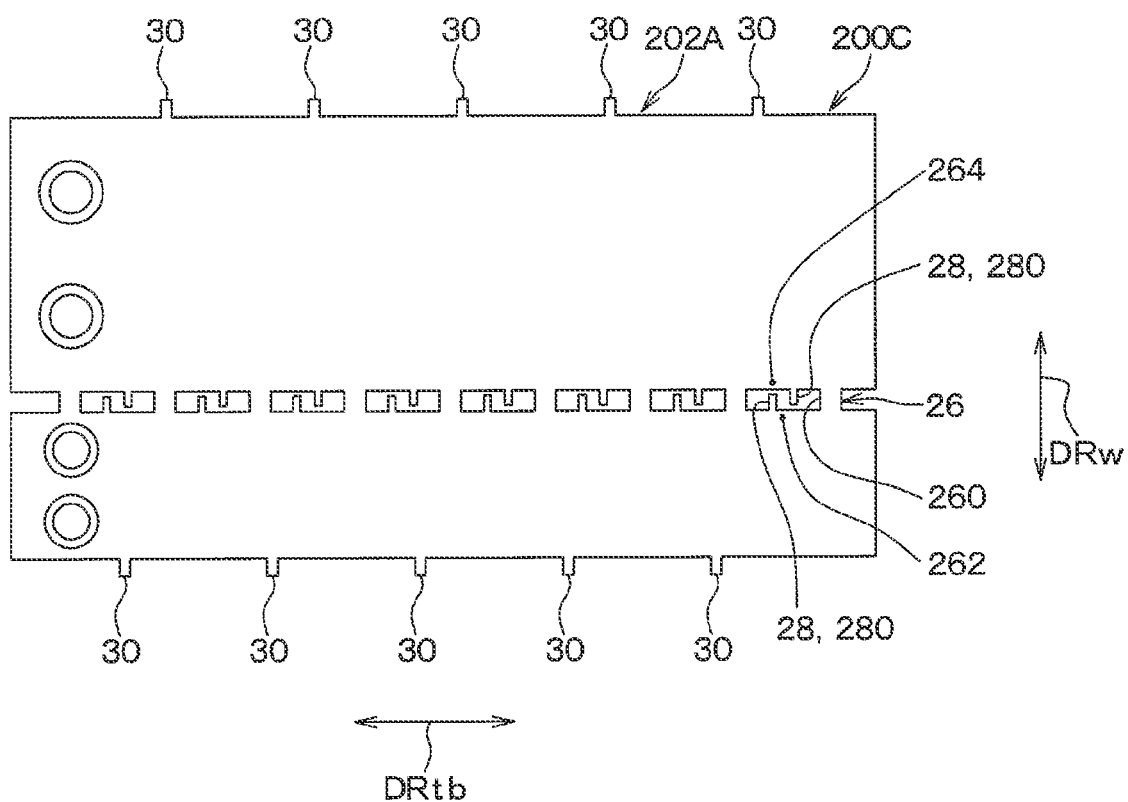
FIG. 21 is a front view schematically illustrating a first plate of the cooling tube according to at least one embodiment.

The first plate portion 202A of the present embodiment is formed of a flat first plate 200C having through-holes 260, as shown in FIG. 21. In the first plate 200C, the claw portion 280 constituting the swaged portion 28 is provided in the periphery of the through-hole 260. Outside claw portions 30 constituting outside swaged portions crimping a pair of plate portions 202A, 204A are provided on the outer periphery of the first plate 200C.

Figure 22:
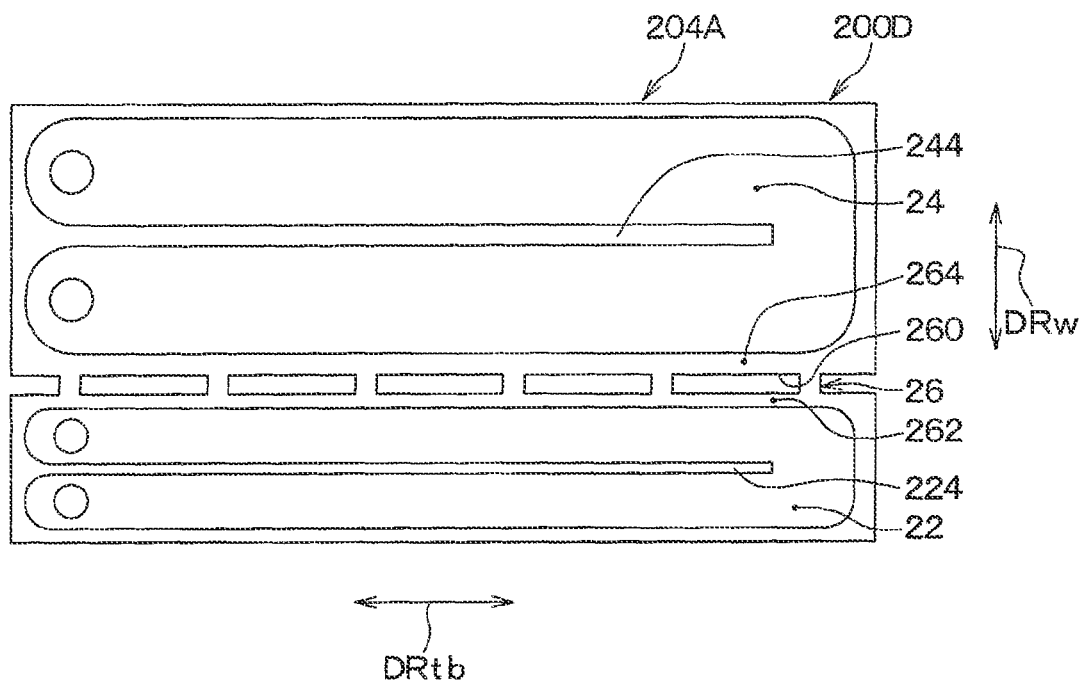
FIG. 22 is a front view schematically illustrating a second plate of the cooling tube according to at least one embodiment.

The second plate portion 204A of the present embodiment is formed of a second plate 200D in which the through-holes 260 and the passage grooves of the engine cooling water passage 22 and the sub-cooling water passage 24 are formed, as shown in FIG. 22. The other configurations are the same as the cooling tube 20 of the first embodiment.

Figure 23:
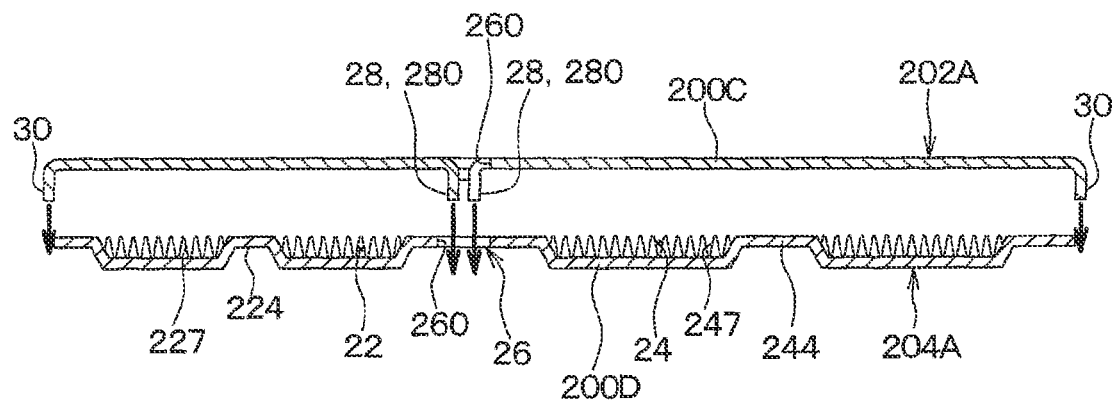
FIG. 23 is a diagram for explaining a preparation step in forming the cooling tube of at least one embodiment.

The method of forming the cooling tube 20 of the present embodiment will be described with reference to FIGS. 23 to 25. In the preparation step of the forming method of the cooling tube 20, the first plate 200C constituting the first plate portion 202A, the second plate 200D constituting the second plate portion 204A, and the inner fins 227, 247, as shown in FIG. 23.

Figure 24:
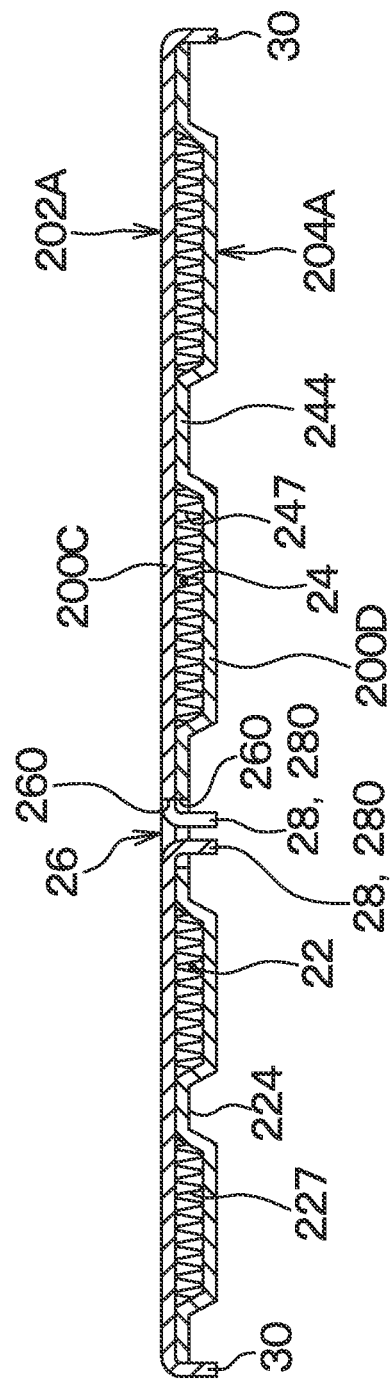
FIG. 24 is a diagram for explaining a temporary assembling step in forming the cooling tube of at least one embodiment.

Subsequently, in the temporary assembling step of the forming method of the cooling tube 20, the claw portions 280 of the first plate 200C constituting the first plate portion 202A are inserted into the through-holes 260 of the second plate portion 200D constituting the second plate portion 204A, as shown in FIG. 24.

Figure 25:
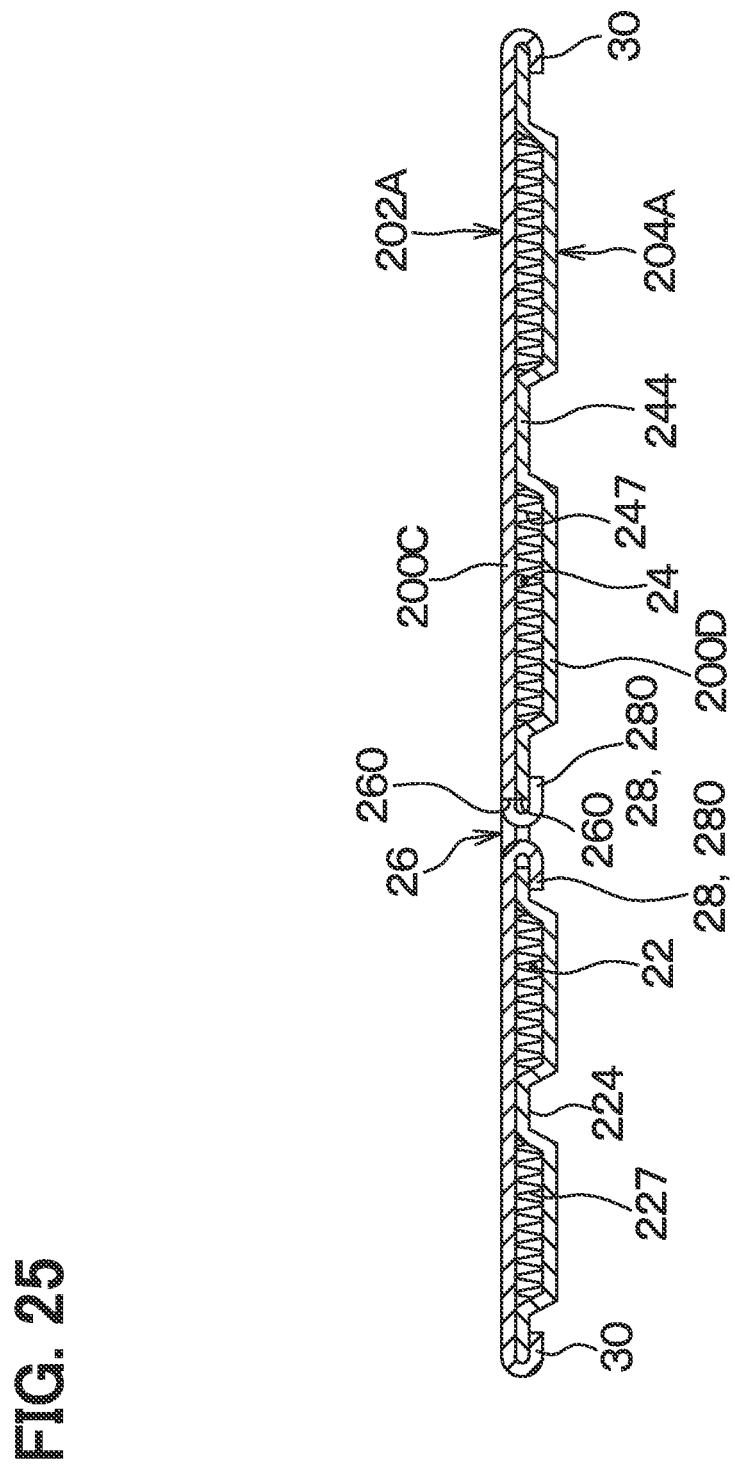
FIG. 25 is a diagram for explaining the temporary assembling step in forming the cooling tube of at least one embodiment.

Then, in the temporary assembling step, as shown in FIG. 25, the claw portions 280 and the outside claw portions 30 are plastically deformed such that the first plate portion 202A and the second plate portion 204A are in close contact with each other at the passage partition portion 26 and the outer periphery.

The cooling tube 20 of the present embodiment is formed by the above-described method. The forming method of the cooling tube 20 described above is an example, and the cooling tube 20 may be formed by another method.

In the subsequent step, a stacked body in which the cooling tubes 20 and the outer fins 40 are alternately stacked with each other shown in FIG. 25 is housed in the casing 12, and then the assembled body of the casing 12 and the stacked body of the cooling tube 20 and the outer fin 40 is brazed.

The intercooler 10 of the present embodiment can achieve the same effects and advantages as the first embodiment, which can be obtained from the structure common to the intercooler 10 of the first embodiment. In the intercooler 10 of the above-described embodiment, the through-holes 260 are formed in the passage partition portion 26 of the cooling tube 20, and the swaged portions 28 for crimping a pair of plate portions 202A, 204A are formed around the through-holes 260. According to the intercooler 10 of the present embodiment, the leakage of the engine cooling water and the sub-cooling water from the cooling tube 20 can be sufficiently suppressed.

Modification of Fourth Embodiment

In the above-described fourth embodiment, the claw portion 280 constituting the swaged portion 28 is provided in the first plate portion 202. However, the present disclosure is not limited to this. In the cooling tube 20, the claw portion 280 constituting the swaged portion 28 may be provided in the second plate portion 204 as in the second plate portion.

In the above-described fourth embodiment, the first plate portion 202A is formed of one plate 200C. However, the present disclosure is not limited to this. For example, the first plate portion 202A may be formed of two plates having the claw portion 280 constituting the swaged portion 28.

Other Embodiments

The present disclosure is not limited to the typical embodiments of the present disclosure described herein, but may include various modifications, such as following configurations.

In the above-described embodiments, the inner fins 227, 247 are provided in the cooling tube 20. However, the present disclosure is not limited to this. In the cooling tube 20, the inner fin 227, 247 may not be provided in at least the engine cooling water passage 22 or the sub-cooling water passage 24.

In the above-described embodiments, the swaged portion 28 is constituted by the claw portion 280 provided in one plate portion of a pair of plate portions 202, 204. However, the present disclosure is not limited to this. The swaged portion 28 may be constituted by claw portions 280 provided both plate portions of a pair of plate portions 202, 204. The swaged portion 28 may be provided separately from a pair of plate portions 202, 204.

As described in the above-described embodiments, in the cooling tube 20, it is preferable that the swaged portions 28 are positioned in the first peripheral portion 262 and the second peripheral portion 264 of the passage partition portion 26 so as not to face each other. However, the present disclosure is not limited to this. In the cooling tube 20, the swaged portions 28 may be provided at a part of the first peripheral portion 262 and a part of the second peripheral portion 264 so as to face each other, for example.

In the above-described embodiments, the engine cooling water passage 22 and the sub-cooling water passage 24 are curved in U-shape. However, the present disclosure is not limited to this. In the cooling tube 20, one or both of the engine cooling water passage 22 and the sub-cooling water passage 24 may have a straight shape or S-shape, for example.

In the above-described embodiments, the first plate portion 202 having a flat shape and the second plate portion 204 having a passage groove defining the cooling water passages 22, 24 are bonded by brazing in a state where the first plate portion 202 and the second plate portion 204 are pressed to contact each other. However, the present disclosure is not limited to this.

In the cooling tube 20, the first plate portion 202 and the second plate portion 204 having passage grooves defining the cooling water passages 22, 24 may be bonded by brazing in a state where the first plate portion 202 and the second plate portion 204 are pressed to contact each other.

In the above-described embodiments, the intercooler 10 of the present disclosure is used in a cooling system for cooling supercharged intake air supplied to an engine EG that is an internal combustion engine from a supercharger SC mounted on a vehicle. However, the present disclosure is not limited to this. The intercooler 10 of the present disclosure may be used in a cooling system for something other than a vehicle, for example.

Needless to say, in the embodiments described above, the elements constituting the embodiment are not necessarily essential unless clearly expressed as particularly essential, or considered as obviously essential in principle, for example.

In the embodiments described above, values such as numbers of the constituent elements, numerical values, quantities, and ranges in the embodiment are not limited to the specific values described herein unless clearly expressed as particularly essential, or considered as obviously limited to the specific values in principle, for example.

In the embodiments described above, the shapes, positional relationships, or other conditions of the constituent elements and the like described in the embodiment are not limited to specific shapes, positional relationships, or other conditions unless clearly expressed, or limited to the specific shapes, positional relationships, or other conditions in principle.

(Conclusion)

According to a first aspect described in some or all of the above embodiments, a pair of plate portions constituting a passage tube are crimped by the swaged portion at the passage partition portion separating the first coolant passage from the second coolant passage.

It may be assumed that the swaged portion is provided in both a part of the periphery on a first coolant passage side of the through-hole and a part of the periphery on a second coolant passage side of the through-hole so as to face each other.

However, if the swaged portions are positioned in the periphery of the through-hole to face each other, the swaged portions may be too close to each other. It may be undesirable because it may make the forming of the cooling tube difficult.

It may be assumed to increase the size of the through-hole of the passage partition portion so as to avoid the situation where the swaged portions are close to each other. However, it may increase the size of the intercooler.

In view of the above points, in the present disclosure, the swaged portions are positioned in the cooling tube. That is, according to a second aspect, the swaged portion is provided at the first peripheral portion that is a part of the periphery of the through-hole on the first coolant passage side and at the second peripheral portion that is a part of the periphery of the through-hole on the second coolant passage side so as not to face each other.

According to this, the swaged portions can be avoided to be too close to each other without increasing the size of the through-hole of the passage partition portion. That is, according to the intercooler of the present disclosure, the leakage of the engine cooling water and the sub-cooling water from the cooling tube can be suppressed while the increase of the size of the intercooler is suppressed.

According to a third aspect, the intercooler includes the claw portion constituting the swaged portion in at least one plate portion of a pair of plate portions. Since the swaged portion is constituted by the claw portion provided in at least one plate portion, the number of the components of the intercooler can be reduced compared to a case where the swaged portion is provided as a component separated from the plate portions. Further, the leakage of the coolant from the cooling tube can be suppressed.

According to a fourth aspect, in the intercooler, a pair of plate portions are formed of one plate. One plate portion of a pair of plate portions is an intermediate part of the plate between two bent portions. The other plate portion of a pair of plate portions is constituted by a pair of outside parts of the plate located outside the two bent portions. The one plate portion includes through-holes. The claw portion constituting the swaged portion is provided in a part of an opposite end of outside parts opposite from the two bent portions, the part facing the through-hole when the plate is bent at the two bent portions.

Since a pair of plate portions of the cooling tube is formed of one plate, the number of the components of the intercooler can be reduced compared to a case where a pair of plate portions are provided separately. Further, the leakage of the coolant from the cooling tube can be suppressed.

What is claimed is:

1. An intercooler configured to cool supercharged intake air supplied to an internal combustion engine through a supercharger, the intercooler comprising:
    a cooling tube including
        a first coolant passage through which a first coolant exchanging heat with the supercharged intake air can flow, and
        a second coolant passage through which a second coolant exchanging heat with the supercharged intake air can flow, the temperature of the second coolant being lower than the temperature of the first coolant, wherein
    the cooling tube includes a pair of plate portions having a predetermined shape,
    the pair of plate portions are bonded with each other by brazing such that the pair of plate portions are superposed on each other to define the first coolant passage and the second coolant passage between the pair of plate portions,
    the cooling tube includes
        a passage partition portion separating the first coolant passage from the second coolant passage at a part of the pair of plate portions between the first coolant passage and the second coolant passage, and
        at least one through-hole in the passage partition portion, and
    at least one swaged portion that crimps the pair of plate portions is provided at a periphery of the through-hole.

2. The intercooler according to claim 1, wherein
the swaged portion is provided at a first peripheral portion of the periphery of the through-hole and at a second peripheral portion of the periphery of the through-hole, the first peripheral portion being a first coolant passage side of the periphery, the second peripheral portion being a second coolant passage side of the periphery, and
the swaged portion provided at the first peripheral portion and the swaged portion provided at the first peripheral portion are positioned so as not to face each other.

3. The intercooler according to claim 1, wherein
a claw portion constituting the swaged portion is provided in at least one plate portion of the pair of plate portions.

4. The intercooler according to claim 1, wherein
the pair of plate portions are formed from a single plate,
one plate portion of the pair of plate portions is an intermediate part of the plate located between two bent portions provided in the plate,
another plate portion of the pair of plate portions is a pair of outside parts of the plate located outside the two bent portions,
the through-hole is provided in the one plate portion, and
a claw portion constituting the swaged portion is provided in a part of an opposite end of the another plate portion opposite from the two bent portions, the part facing the through-hole when the plate is bent at the two bent portions.

* * * * *